US010375665B2

(12) United States Patent
Li et al.

(10) Patent No.: US 10,375,665 B2
(45) Date of Patent: Aug. 6, 2019

(54) METHOD AND APPARATUS FOR SUPPORTING ACCESS CONTROL AND MOBILITY MANAGEMENT

(71) Applicants: Xu Li, Nepean (CA); Hang Zhang, Nepean (CA)

(72) Inventors: Xu Li, Nepean (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/881,605

(22) Filed: Jan. 26, 2018

(65) Prior Publication Data

US 2018/0227872 A1 Aug. 9, 2018

Related U.S. Application Data

(60) Provisional application No. 62/502,324, filed on May 5, 2017, provisional application No. 62/473,231, filed on Mar. 17, 2017, provisional application No. 62/455,492, filed on Feb. 6, 2017.

(51) Int. Cl.
| | |
|---|---|
| *H04W 60/02* | (2009.01) |
| *H04W 60/00* | (2009.01) |
| *H04W 60/04* | (2009.01) |
| *H04W 76/20* | (2018.01) |
| *H04W 48/16* | (2009.01) |
| *H04W 8/02* | (2009.01) |
| *H04W 88/02* | (2009.01) |

(52) U.S. Cl.
CPC ............. *H04W 60/04* (2013.01); *H04W 8/02* (2013.01); *H04W 48/16* (2013.01); *H04W 76/20* (2018.02); *H04W 88/02* (2013.01)

(58) Field of Classification Search
CPC ....... H04W 4/70; H04W 76/27; H04W 76/20; H04W 8/06; H04W 28/12; H04W 60/00; H04W 76/10; H04Q 2213/13274; H04L 47/32
See application file for complete search history.

(56) References Cited

U.S. PATENT DOCUMENTS

| | | | |
|---|---|---|---|
| 2012/0002545 A1 | 1/2012 | Watfa et al. | |
| 2013/0079006 A1* | 3/2013 | Cho | H04W 8/06 455/435.1 |
| 2014/0003348 A1 | 1/2014 | Velev et al. | |
| 2016/0100362 A1 | 4/2016 | Palanisamy et al. | |
| 2018/0227978 A1* | 8/2018 | Keller | H04W 4/14 |

FOREIGN PATENT DOCUMENTS

| | | |
|---|---|---|
| CN | 102893668 A | 1/2013 |
| EP | 3018946 A1 | 5/2016 |

OTHER PUBLICATIONS

3GPP TS 23.501 V0.1.1; 3rd Generation Partnership Project; Technical Specification Group Services and System Aspects; System Architecture for the 5G System; Stage 2 (Release 15), Jan. 26, 2017.

(Continued)

*Primary Examiner* — Gary Lafontant

(57) ABSTRACT

The present application provides a method and apparatus for supporting general registration of user equipment to facilitate MO only mode preferences.

14 Claims, 10 Drawing Sheets

(56) References Cited

OTHER PUBLICATIONS

"System Architecture for the 5G System; Stage 2"; 3GPP TS 23.501 V03.1 (Mar. 2017).
"Procedures for the 5G System; Stage 2"; 3GPP TS 23.502 V0.2.0 (Feb. 2017).
"Study on Architecture for Next Generation System"; 3GPP TR 23.799 V14.0.0 (Dec. 2016).

* cited by examiner

METHOD AND APPARATUS FOR SUPPORTING ACCESS CONTROL AND MOBILITY MANAGEMENT

CROSS REFERENCE TO RELATED APPLICATIONS

This application is related to U.S. Provisional Patent Application Ser. No. 62/455,492 entitled "Method and Apparatus for General User Equipment Registration" filed Feb. 6, 2017, to U.S. Provisional Patent Application Ser. No. 62/473,231 entitled "Method and Apparatus for Supporting Mobile Devices Utilizing a Mobile-initiated Communication Mode" filed Mar. 17, 2017, and to U.S. Provisional Patent Application Ser. No. 62/502,324 entitled "Method and Apparatus for Supporting Access Control and Mobility Management", the contents of all of which are incorporated herein by reference, inclusive of all filed appendices.

FIELD

The present invention pertains to the field of wireless communication networks and in particular to a method and apparatus for general user equipment registration.

BACKGROUND

The $3^{rd}$ Generation Partnership Project (3GPP) technical report numbered TR 23.799 and entitled "Study on Architecture for Next Generation System," version 14.0.0, December 2016 (hereinafter referred to as TR 23.799), represents one approach to the design of a system architecture for next generation mobile networks, also referred to as $5^{th}$ generation (5G) networks. Section 6.3 of this document considers potential solutions to the key issue of providing a mobility framework. Within this section is a description of a Mobile Originating (MO) only mode for a User Equipment (UE) 100 (FIG. 1) that does not require mobile terminated service (i.e., the UE 100 does not have or expect downlink (DL) traffic) or that wants to limit its reachability.

A UE mode, referred alternatively to as the Mobile Initiated Connection Only (MICO), or the Mobile Initiated Communication Only (MICO) mode, is described in Section 5.4.1.3 of the $3^{rd}$ Generation Partnership Project (3GPP) technical specification numbered TS 23.501 and entitled "Technical Specification Group Services and System Aspects; System Architecture for the 5G System," version 0.3.1, March 2017 (hereinafter referred to as TS 23.501). However, the system would benefit from certain improvements related to the MICO mode.

For purposes of this disclosure, MO-only mode and MICO mode can be considered substantially equivalent and used interchangeably. In some instances, the term MO/MICO or MO-only/MICO is used to emphasize this applicability to either mode.

Therefore, there is a need for a method and apparatus serving mobile wireless communication devices in wireless communication networks such as proposed 5G networks, for providing MO-only/MICO mode, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

According to a first aspect, there is disclosed a method for managing a connection of a UE to a network, the method comprising actions at an access node of: receiving a registration request from the UE comprising a MICO mode preference and a suggested duration for the MICO preference; and transmitting the registration request to an AMF for a determination of whether the MICO mode is allowed for the UE based on a communication pattern, the AMF transmitting the determination and a periodic registration update timer value for the MICO mode to the UE; wherein the UE performs a registration update when the periodic registration update timer expires.

In an embodiment, the communication pattern can suggest the absence of network-initiated communications with the UE and the determination can be to allow MICO mode with a large MICO periodic registration update timer value.

In an embodiment, the communication pattern can suggest scheduled network-initiated communications with the UE at a future time and the determination can be to allow MICO mode with a periodic registration update timer value that will expire before the future time occurs.

In an embodiment, the communication pattern can suggest uncertainty about a schedule of network-initiated communications with the UE and the determination can be to not allow MICO mode.

In an embodiment, the UE can reset a periodic registration update timer with the periodic registration update timer value when it enters a connected state.

In an embodiment, the AMF can provide a non-stoppable timer indication together with the determination to the UE and the UE can refrain from resetting the periodic update timer before the periodic registration update timer expires, even if the UE enters the connected state, until the non-stoppable timer indication is removed.

In an embodiment, the AMF can transmit an active timer value to the UE with the determination and the UE can set an active timer with the active timer value upon receipt thereof, reset the active timer with the active timer value when it has MO data to send, reset the active timer with the active timer value when it receives MT data and leave the connected state only upon expiry of the active timer.

According to a second aspect, there is disclosed an access node comprising a radio interface, a network interface, a process or and a machine-readable memory. The radio interface is for communicating with a UE. The network interface is for communicating with nodes within a (R)AN and a network. The machine-readable memory is for storing instructions that, when executed by the processor, causes the access node to carry out the method of the first aspect and/or any embodiments thereof.

According to a third aspect, there is disclosed a method for managing a connection of a UE to a network, comprising actions at the UE of: transitioning into a state of connection with the network and starting a timer having a duration obtained from an AMF in the network; transmitting MICO data to an access node in communication therewith while in the state of connection; and remaining in the state of connection after ceasing to transmit MICO data until at least after expiry of the timer.

In an embodiment, upon expiry of the timer, the UE can transition into a state of idleness if no longer transmitting MICO data. In an embodiment, the action of transitioning into a state of idleness can comprise being released from the network by the access node.

In an embodiment, the AMF can determine the duration based on a communication pattern derived from user subscription data, a communication pattern and/or a mobility pattern. In an embodiment, the communication pattern can indicate that the MICO data will not trigger MT data and the duration can be a default value. In an embodiment, the communication pattern can indicate that the MICO data will trigger MT data after a time interval and the duration can exceed the time interval and a round trip delay of a packet.

According to a fourth aspect there is disclosed a UE comprising a processor and a machine-readable memory. The machine-readable memory is for storing instructions that, when executed by the processor, cause the UE to carry out the method of the third aspect and/or any embodiments thereof.

According to a fifth aspect there is disclosed a method for managing a connection of a UE to a network, comprising actions at the UE of: receiving MT data from an access node while in a state of connection with the network in response to transmitting MICO data; requesting a transition from the state of connection to a state of idleness to an AMF; and transitioning to the state of idleness upon obtaining a release from the network by the AMF.

In an embodiment, the action of requesting can comprise sending the request to the access node.

According to a sixth aspect, there is disclosed a UE comprising a processor and a machine-readable memory. The machine-readable memory is for storing instructions that, when executed by the processor, cause the UE to carry out the method of the fifth aspect and/or any embodiments thereof.

It should be understood that embodiments of an aspect may be used in isolation or in conjunction with other embodiments. In some cases, embodiments of one aspect may also be applied to other aspects.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "User Equipment" (UE) 100 is used for purposes of clarity. However, the UE 100 may refer to one of a variety of devices, generally referred to herein by the term "mobile devices" and including mobile stations, terminals or nodes, fixed or stationary devices, stations, terminals, or nodes, human-type communication devices, machine-type communication (MTC) devices, Internet of Things (IoT) devices, other wireless end nodes, which communicate with a radio access node via wireless communication. Another term used synonymously with UE 100 and mobile device is "electronic device". One skilled in the art will appreciate that the term "mobile device" is used to refer to a device designed to connect to a mobile network. This connection typically makes use of a wireless connection to an access node. Although the mobile network is designed to support mobility, it is not necessary that the mobile device itself be mobile. Some mobile devices, such as metering devices (e.g., smart meters) may not be capable of mobility, but still make use of the mobile network.

As used herein, an Access Node (AN) 102 (FIG. 1) can be a 3GPP AN, referred to as a RAN, or a non-3GPP AN. The term (R)AN can be used to emphasize that an AN can be a RAN or non-3GPP AN. In some situations, the term RAN may also refer to the radio access network, but those of skill in the art will be able to differentiate between these uses.

Figure 8:
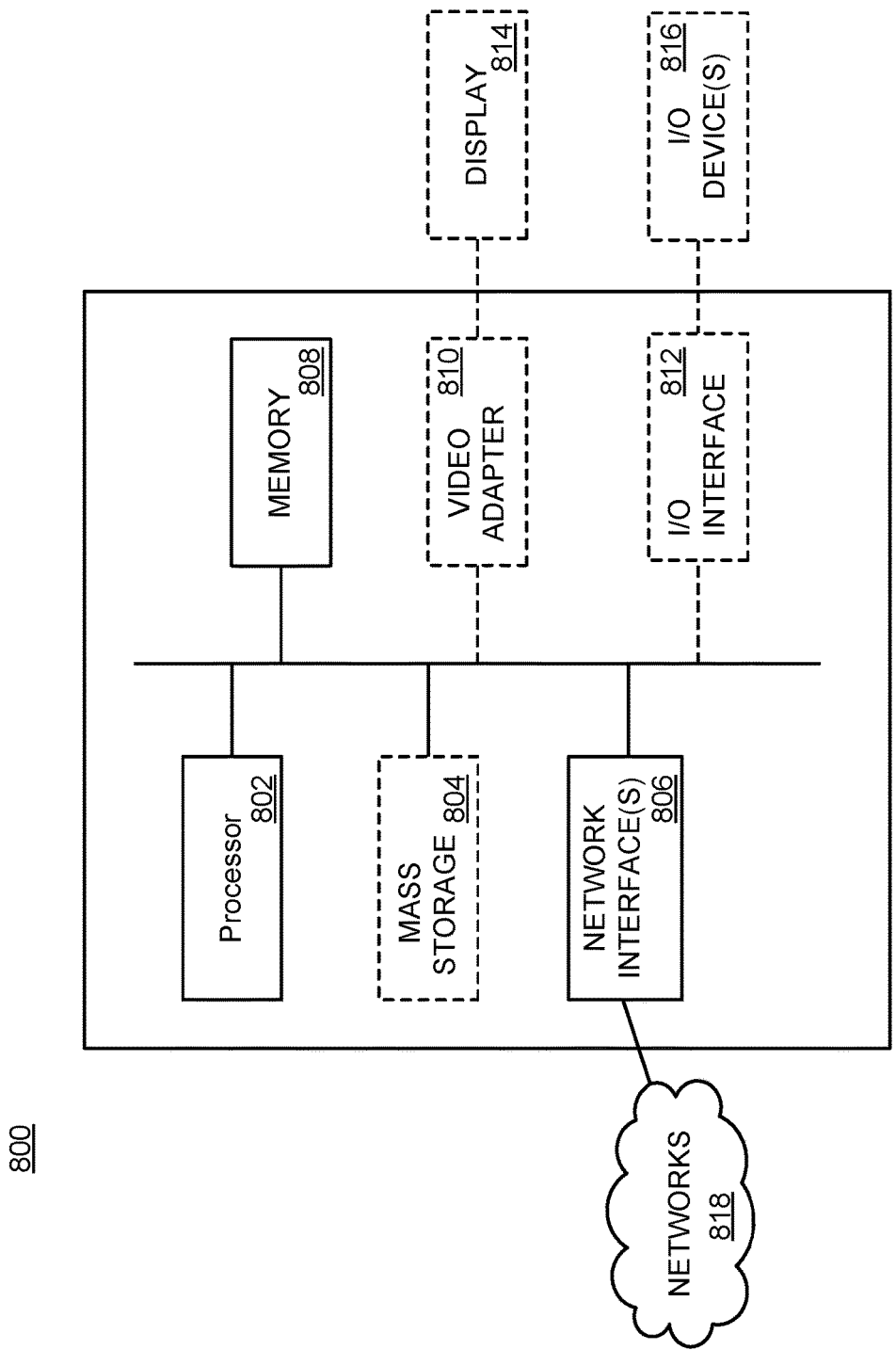
FIG. 8 is a block diagram illustrating an apparatus for carrying out methods of the present invention as described herein.

The present application uses a number of acronyms that are based on current terminology used in the 3GPP standards process. Terms are subject to change as the process progresses, but current terms used by persons of skill in the art include:

AF—Application Function
AMF—Access and Mobility Management Function
AN—Access Node
AT—Access Technology
AUSF—Authentication Server Function
CM—Connection Management
CN—Core Network
CP—Control Plane
DL—Downlink
DNN—Data Network Name
EIR—Equipment Identity Registry
GW—Gateway
HO—Hand Over
ID—Identifier number
IMSI—International Mobile Subscriber Identity
IoT—Internet of Things
LT—Location Tracking
ME—Mobile Equipment
MICO—Mobile Initiated Connection Only or Mobile Initiated Communication Only
MM—Mobility Management
MO—Mobile Originating
MT—Mobile Terminated
MTC—Machine-Type Communication
NAS—Non-Access Stratum
NEF—Network Exposure Function NG—Next Generation
NSSAI—Network Slice Selection Assistance Information
PCF—Policy Control Function
PDU—Protocol Data Unit
PEI—Permanent Equipment Identifier
PLMN—Public Land Mobile Network
QoS—Quality of Service
(R)AN—Radio Access Network
RRC—Radio Resource Control
SMF—Session Management Function
S-NSSAI—Single Network Slice Selection Assistance Information
SUPI—Subscriber Permanent Identity
UDM—Unified Data Management
UE—User Equipment
UL—Uplink
UP—User Plane
UPF—User Plane Function
5G-GUTI—5G Globally Unique Temporary Identifier Embodiments of the present invention comprise operations automatically provided by one or more nodes and/or functions forming part of a wireless communication network 818 (FIG. 8). Each node and/or function may be associated with enabling components such as a microprocessor 802 (FIG. 8), electronic memory 804, 808 (FIG. 8), and communication interface or interfaces 806, 810, 812 (FIG. 8). The microprocessor 802 may execute program instructions stored in memory 804, 808 in order to implement the desired functionality of the node and/or function as described herein. The microprocessor 802 and memory 804, 808 may be at least partially replaced with equivalent electronic components such as digital logic components in some embodiments. Nodes and/or functions may be operated on dedicated hardware or they may be virtualized, that is made to operate on generic hardware platforms in accordance with a network function virtualization (NFV) framework.

Section 8.3 of TR 23.799, referred to above, provides an agreement for UE reachability and for support for an MO-only/MICO mode. In particular, according to the agreement, based on UE indicated preferences, UE subscription data and network policies, or any combination of them, the Next Generation (NG) Core Network (CN) 818 can determine whether MO-only mode can be applied for the UE 100. An indication of the result of this determination is sent to the UE 100 during registration signalling. The UE 100 and core network 818 can then re-initiate (or exit) the MO-only mode with subsequent registration signalling.

Furthermore, a UE 100 in MO-only/MICO mode is characterized by the UE 100 performing a registration upon the expiration of a registration timer (with potentially a very long periodic registration timer and/or periodic registration update timer (which terms may be used interchangeably) value), but not necessarily listening to (or responding to) paging between registrations. In case the UE 100 is in MO-only/MICO mode, the CN 818 can inform the (R)AN 102 that the UE 100 will not be listening to paging (e.g., a (R)AN 102 can decide to never keep an inactive MO-only mode UE 100 in a radio resource control (RRC) Inactive state). By transmitting an indication to the (R)AN 102, the CN 818 node is able to allow the (R)AN 102 to reduce the signalling associated with a node in MO-only/MICO mode.

Finally, the agreement states that for a UE 100 in MO-only/MICO mode the CN 818 determines the frequency of periodic registration.

The present application provides a method and apparatus for updating a general UE registration procedure to meet the requirements of the above agreement.

Figure 1:
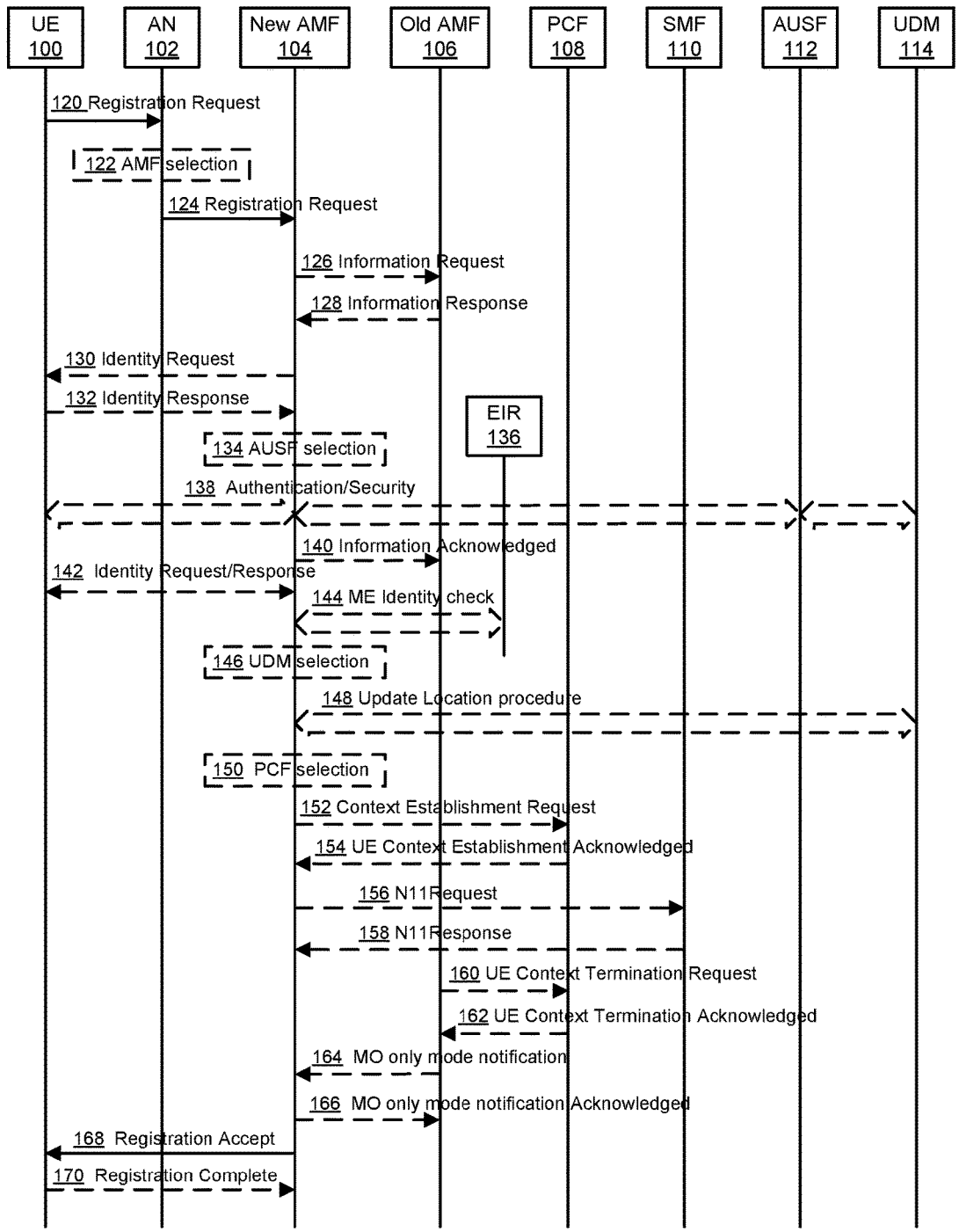
FIG. 1 presents a signaling diagram illustrating an embodiment of a procedure for updating a general UE registration procedure.

FIG. 1 provides a signalling diagram summarizing the steps of a method for general registration of a UE 100 in a communications network.

In step 120, UE 100 communicates an (R)AN registration request to (R)AN 102. The registration request message can include (R)AN parameters along with a registration request. The registration request may include the following details: Registration type, Subscriber Permanent Identifier (SUPI) or 5G Globally Unique Temporary Identifier (5G-GUTI), Security parameters, network slice selection assistance information (NSSAI), UE 5G CN Capability, protocol data unit (PDU) session status, and MO-only/MICO mode preference indicator. The MO-only/MICO mode preference indicator can indicate whether MO-only/MICO mode is preferred by the UE 100, and if preferred, it may also indicate a suggested duration.

In case of 5G-(R)AN, the (R)AN parameters may include, for example a SUPI or the 5G-GUTI, and/or the selected NSSAI.

The Registration type field can indicate whether the UE 100 wants to perform an "initial registration" (i.e., when the UE 100 is in non-registered state), a "mobility registration" or "mobility registration update" (i.e., when the UE 100 is in a registered state and initiates a new or updated registration (i.e. a registration procedure) due to mobility) or a "periodic registration" or "periodic registration update" (i.e., when the UE 100 is in a registered state and initiates a new or updated registration (i.e. a registration procedure) due to expiration of a periodic update timer). See e.g. Section 4.2.2.2.1 of TS 23.501. If included in the registration request, the 5G-GUTI can be used to indicate the last serving access and mobility management function (AMF) 104, 106 (FIG. 1). In some embodiments, if the UE 100 is already registered via a non-3GPP access in a public land mobile network (PLMN) different from the PLMN of the 3GPP access, the UE 100 is configured to refrain from providing the UE Temporary ID allocated by the AMF 104, 106 during the registration procedure over the non-3GPP access. Security parameters transmitted in this message may be used for Authentication and integrity protection. NSSAI indicates the Network Slice Selection Assistance Information (as defined in TS 23.501 (e.g. Section 5.15). The PDU session status indicates the available (e.g. previously established) PDU sessions in the UE 100. In the following figures, dashed lines have been used to indicate steps that may be performed as either optional steps or conditional steps.

Step 122 can be performed when a SUPI is included or when the 5G-GUTI does not indicate a valid AMF 104, 106. In this optional step 122, the (R)AN 102, based on Access Technology (AT) (or more specifically a Radio AT (RAT)) and NSSAI, if available, selects an AMF 104, 106. The AN 102 can use any of a number of different techniques to select an AMF 104, 106, such as those described in TS 23.501.

In some embodiments, if the (R)AN 102 cannot select an AMF 104, 106, it forwards the Registration Request to a default AMF 104, 106. The default AMF 104, 106 is responsible for selecting an appropriate AMF 104, 106 for the UE. The relocation between the default AMF 104, 106 and selected AMF 104, 106 is described in Section 4.2.2.2.3 of TS 23.502, where the initial AMF 104, 106 refers to the default AMF 104, 106, and the target AMF 104, 106 refers to the selected AMF 104, 106.

In step 124 (R)AN 102 transmits a registration request message to AMF 104. In some embodiments, this registration request takes the form of an N2 message. The N2 message can comprise N2 parameters and a Registration Request (which may include Registration type, and/or Permanent User ID (e.g. a SUPI) or 5G-GUTI, Security parameters, and/or NSSAI)). When 5G-(R)AN is used, the N2 parameters can include the Location Information, Cell Identity and/or the RAT type related to the cell in which the UE 100 is camping. In some embodiments, if the Registration type indicated by the UE 100 corresponds to the periodic registration update case, then subsequent steps up to and including UE context establishment 152 and/or 154 can be omitted.

Optionally, in step 126, new AMF 104 can transmit an information request to an old AMF 106 (such as one indicated in (or determined in accordance with) the registration request 120) to complete the Registration Request. For example, if the UE's 5G-GUTI was included in the Registration Request and the serving AMF 104, 106 has changed since last registration, the new AMF 104 may send the Information Request to the old AMF 106 including the complete Registration Request IE to request the UE's SUPI and MM Context.

If step 126 is performed, then, at step 128, old AMF 106 transmits an Information Response (including, for example, UE's SUPI, MM Context, and/or SMF information) to the new AMF 104. If the old AMF 106 holds information about active PDU Sessions, the old AMF 104 can include, in the Information Response SMF 110, information including SMF identities and/or PDU session identities.

Optionally, in step 130, new AMF 104 transmits an Identity Request to the UE 100. In particular, when the SUPI is not provided by the UE 100 nor is it retrieved from the old AMF 106, the Identity Request procedure can be initiated by the new AMF 104 by sending an Identity Request message to the UE 100.

If step 130 is performed, then, in step 132, the UE 100 transmits an Identity Response to the new AMF 104. The UE 100 responds to the Identity Request sent in step 130 with an Identity Response message including the SUPI.

In step 134, the new AMF 104 may decide to invoke an authentication server function (AUSF) 112. In that case, the new AMF 104, can select an Authentication Server Function (AUSF) 112. This selection may be made in accordance with the SUPI, as described in TS 23.501.

In step 138, the AUSF 112 selected in step 134 initiates authentication of the UE 100 and non-access stratum (NAS) security functions. The authentication and security can be performed using any number of different techniques. The particulars of the implementation of the authentication and security processes may be based on generally accepted processes such as those described in other 3GPP documents including TS 23.501. It is noted that, the AMF 104, 106 selection may be performed after this step 138, for example, due to requirements imposed based on the implementation of network slicing. Accordingly, the methods used may vary and may be similar to those provided in TS 23.502.

In step 140, if the AMF 104, 106 has changed the new AMF 104 acknowledges the transfer of UE 100 MM context to the old AMF 106. If the authentication/security procedure fails, then the Registration can be rejected, and the new AMF 104 can send a reject indication to the old AMF 106. If this occurs, then the old AMF 106 can continue as the AMF 104, 106 associated with the UE 100 as if the Information Request was never received.

If the permanent equipment identifier (PEI) was neither provided by the UE 100 nor retrieved from the old AMF 106, then, in step 142, an Identity Request procedure can be initiated by the AMF 104 sending an Identity Request message to the UE 100 to retrieve the PEI.

In optional step 146, the AMF 104 initiates a Mobile Equipment (ME) identity check with the Equipment Identity Registry (EIR) 136. The PEI check may be performed as described in clause 4.7 of TS 23.502.

If step 148 is to be performed, then, at step 146, the AMF 104 first selects a Unified Data Management (UDM) 114 function based on the SUPI, for example, as described in TS 23.501.

In step 148, if the AMF 104 has changed since the last registration, or if there is no valid subscription context for the UE 100 in the AMF 104, or if the UE 100 provides a SUPI which doesn't refer to a valid context in the AMF 104, the AMF 104 initiates the update location procedure. The update location procedure of step 148 includes the UDM initiating a Cancel Location to the old AMF 106, if any. The old AMF 106 can remove the MM context and can notify all possibly associated session management function(s) (SMF(s)) 110, and the new AMF 104 creates an MM context for the UE 100 after getting the AMF related subscription data from the UDM 114. The AMF related subscription data may include a DL communications schedule, if any exists, of the UE 100. The AMF related subscription data may include communication pattern parameters of the UE 100, which may include a periodic communication indicator, scheduled communication time(s), an indication of whether communication is mobile initiated or network-initiated, an indication of whether communication of MT data is expected to be triggered by communication of MO data, and/or an expected time interval between MT data and MO data communication events, etc.

In one embodiment, at step 148, the AMF 104 can obtain a DL or network-initiated communication activity schedule from the UDM 114, if any, in order to determine whether to apply the MO-only mode to the UE 100 and the periodic registration update timer.

If no DL or network-initiated communication activity is expected, the UE 100 can be assigned the MO-only mode and the timer can be set to a large value. However, if DL or network-initiated communication activity is expected to occur, the UE 100 can be assigned with the non-MO-only mode.

If DL or network-initiated communication activity is expected, but is not going to occur soon, the UE 100 can be assigned to the MO-only mode and the timer can be set to a value such that the UE 100 will perform its periodic registration before the expected communication activity takes place. This allows the UE 100 to be in MO-only mode but to exit the mode in advance of expected DL transmissions. If DL communication activity is uncertain, the UE 100 can be assigned non-MO-only mode.

If the communication pattern parameters include an indication of whether communication of MT data is expected to be triggered by communication of MO data, and/or an expected time interval between MT data and MO data communication events, when the AMF 104 detects that the UE 100 has entered the CM_CONNECTED state for MO data transmission in the UL direction (by way of non-limiting example, when the UE 100 performs a service request rather than a registration, the AMF 104 may conclude that the UE 100 wants to transmit MO data in the UL direction), the AMF 104 may trigger the UE 100 to perform a registration update in order to renegotiate the MICO mode so that the UE 100 can exit the MICO mode and receive MT data in the DL direction that is triggered by the MO data In the UL direction. In some examples, in such a scenario, the AMF 104 may directly inform the UE 100 to exit/deactivate the MICO mode, by way of non-limiting example, through a UE configuration update procedure. If the communication pattern information includes an indication of whether communication of MT data is expected to be triggered by communication of MO data, and/or an expected time interval between MT data and MO data communication events, the AMF 104 may disallow and/or deactivate the MICO mode for the UE 100 and reports that this has occurred to the UE 100, by way of non-limiting example, during registration and/or a registration update.

The update location procedure may be performed as described in TS 23.502. During the update location procedure of step 148, the PEI is provided to the UDM 114.

Optionally, in step 150, the AMF 104, based on the SUPI, selects a Policy Control function (PCF) 108. The AMF 104 can select a PCF 108 using any of a number of different procedures, such as those described in TS 23.501.

If PCF 108 is selected (and in some embodiments when the AMF 104, 106 has not been able to obtain or has not yet obtained an AMF-related operator policy, and/or if the local AMF policy is not considered appropriate and/or valid), then in step 152, the AMF 104 transmits a UE Context Establishment Request to the PCF 108, requesting the PCF 108, for example, to apply operator policies for the UE 100. In some embodiments, this Context Establishment Request can be related to the SUPT. The UE Context Establishment request may optionally include a UE identifier such as a SUPT. In various embodiments, if the AMF 104 has not yet obtained AMF-related operator policies for the UE 100 and/or if the operator policies in the AMF 104 are no longer valid, the AMF 104 requests the PCF 108 to apply operator policies for the UE 100.

In some embodiments, the PCF 108 can determine that the UE 100 should be in MO-only mode, and in others it can determine the MO-only mode parameters for the UE 100. In such cases, the PCF 108 can transmit an indication of the decision and/or the parameters to the AMF 104. This indication can be included in the acknowledgement message of step 154. In some embodiments, the PCF 108 can provide the AMF-related operator policies for the UE 100 to the AMF 104. When the acknowledgement message includes this indication, the PCF 108 may need to interact with the UDM 114 to obtain a DL or network-initiated communication activity schedule in order to make such a decision. In such an embodiment, it is the PCF 108, not the AMF 104 that obtains DL or network-initiated communication schedule from the UDM 114 and determines the MO-only mode selection by itself, in contrast to embodiments discussed above. It should be understood that other variations discussed above with respect to the method can also be implemented in this embodiment.

In step 154 the PCF 108 communicates with the AMF 104 to respond to and/or acknowledge the UE Context Establishment Request message. In some embodiments, the response message can include operator policy, such as AMF-related operator policy, e.g. for the UE 100 to the AMF 104.

In some embodiments, the AMF 104 at this point determines or updates the expected UE behaviour or Mobility Pattern for the UE 100 as described in Section 5.3.4.2 of TS 23.501. According to the expected UE behaviour or Mobility Pattern, the AMF 104 determines whether to apply the MICO mode to the UE 100 and the periodic registration update timer value for the UE 100, as described in Section 5.4.1.3 in TS 23.501.

If the AMF 104, 106 is changed, then, in step 156 the new AMF 104 communicates with each SMF 110 to notify each SMF 110 of the new AMF 104 serving the UE 100. The AMF 104 verifies the PDU session status from the UE 100 with the available SMF 110 information. In case the AMF 104, 106 has changed the available SMF 110 information has been received from the old AMF 106. The AMF 104 requests the SMF 110 to release any network resources related to PDU sessions that are not active in the UE 100.

If step 156 is performed then, in step 158, the SMF 110 communicates a response to the AMF 104. The SMF 110 may decide to trigger this step, for example, in the case of user-plane (UP) function (UPF) 400 (FIG. 4) relocation as described in TS 23.502. If the Registration type indicated by the UE 100 is a periodic registration update, then the subsequent steps 160 and 162 may be omitted.

If the old AMF 106 previously requested a UE context to be established in the PCF 108, then, in step 160, the old AMF 106 can terminate the UE context in the PCF 108. In step 162 the PCF 108 transmits a UE Context Termination Acknowledgement to the old AMF 106. In some embodiments if MO-only/MICO mode is selected for the UE 100, the AMF 104, 106 informs indicates it to the (R)AN 102.

In step 164, AMF 104 informs the (R)AN 102 whether the MO-only/MICO mode is selected for the UE 100 and, in step 166, MO-only mode notification is acknowledged by the (R)AN 102 to the new AMF 104. In some embodiments, the step 164 is optional if the MO-only mode selection decision has not changed for the UE 100.

In step 168, the AMF 104 sends a Registration Accept message to the UE 100 indicating that the registration has been accepted. The Registration Accept message may include 5G-GUTI, Registration area. Mobility restrictions, PDU session status, NSSAI, MO-only/MICO mode indicator, and/or periodic registration update timer. A 5G-GUTI is included if the AMF 104 allocates a new 5G-GUTI. Mobility restrictions can be included in case mobility restrictions apply for the UE 100. The AMF 104 can indicate the PDU session status to the UE 100. The UE 100 can remove any internal resources related to PDU sessions that are not marked active in the received PDU session status. If the PDU session status information was in the Registration Request, the AMF 104 can indicate the PDU session status to the UE 100. The NSSAI includes the accepted Single NSSAIs (S-NSSAIs).

Optionally, in step 170 the UE 100 sends a Registration Complete message to the AMF 104 to acknowledge that a new 5G-GUTI was assigned.

Figure 2:
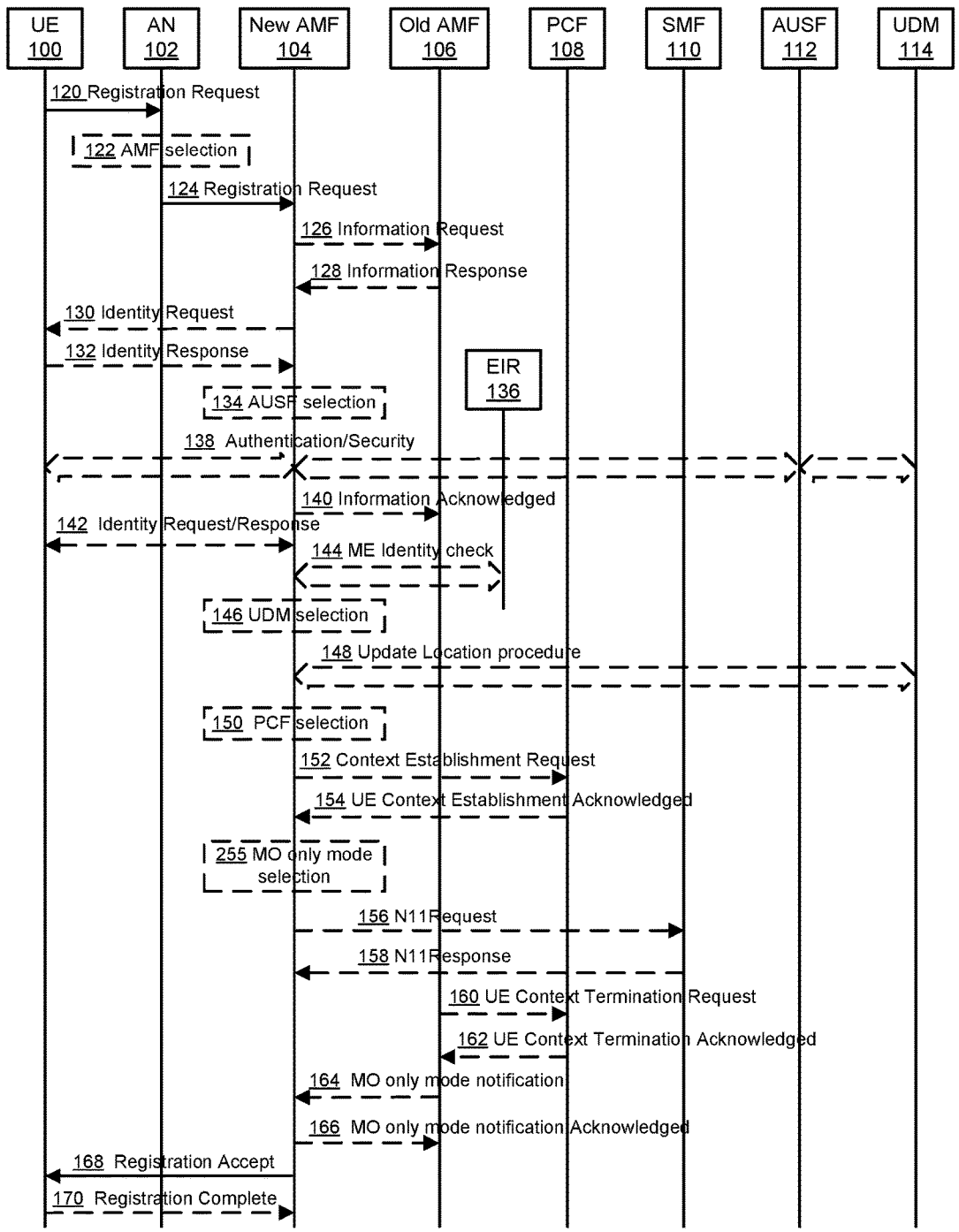
FIG. 2 presents a signaling diagram illustrating another embodiment of a procedure for updating a general UE registration procedure.

FIG. 2 provides a signalling diagram summarizing the steps of a method for general registration of a UE 100 in a communications network. As shown in FIG. 2, steps 120-154 are similar to steps 120-154 of the procedure summarized in FIG. 1.

In step 152, if the AMF 104 has not yet obtained AMF-related operator policies for the UE 100 or if the operator policies in the AMF 104 are no longer valid, the AMF 104 transmits a context establishment request to the PCF 108 to apply operator policies for the UE 100. The request can include a UE identifier such as the SUPI. In step 154, the PCF 108 transmits a context establishment response to the AMF 104. For example, the PCF 108 acknowledges the UE Context Establishment Request message and transmits related operator polices for the UE 100 to the AMF 104.

In optional step 255, the AMF 104 determines whether to assign the MO-only mode to the UE 100 and the periodic registration update timer value for the UE 100 according to the subscription data, operator polices, and UE preference. In one embodiment, where the subscription data indicates no DL communication activity for the UE 100, the MO-only mode may be selected for the UE 100 and the periodic registration update timer may be set to a large value. In another embodiment, where the subscription data indicates DL communication activity is about to happen, the MO-only mode may not be selected for the UE 100. Alternatively, if the subscription data indicates DL communication activity is not going to happen soon, the MO-only mode may be selected for the UE 100 and the periodic registration update timer may be set with a value so that the timer will expire before the DL activity takes place. Finally, if the subscription data indicates uncertainty about DL communication activity and/or its schedule, the MO-only mode may not be selected for the UE 100.

If the AMF 104 is changed, then, in step 256 the new AMF 104 communicates with each SMF 110 to notify each SMF 110 of the new AMF 104 serving the UE 100. The AMF 104 verifies the PDU session status from the UE 100 with the available SMF 110 information. In case the AMF 104 has changed the available SMF information has been received from the old AMF 106. The new AMF 104 requests the SMF 110 to release any network resources related to PDU sessions that are not active in the UE 100.

If step 256 is performed then, in step 258, the SMF 110 communicates a response to new AMF 104. The SMF 110 may decide to trigger this step, for example, in the case of UPF 400 relocation as described in TS 23.502.

If the old AMF 106 previously requested a UE context to be established in the PCF 108, then, in step 260, the old AMF 106 can terminate the UE context in the PCF 108. In step 162 the PCF 108 transmits a UE Context Termination Acknowledgement to the old AMF 106.

In the case where the registration is the initial registration of the UE 100 or if the UE 100's MO-only mode configuration changes, the new AMF 104 notifies the (R)AN 102 whether the MO-only mode is selected for the UE 100. The notification may include the MO-only mode indicator. If there is no MO-only mode Indicator in the notification then, in some embodiments it can be considered an implied indication that the MO-only mode is not selected for the UE 100. The notification may also include the periodic registration update timer in the case the MO-only mode is selected for the UE 100.

In step 266, the MO-only mode Selection Notification is acknowledged by the (R)AN 102 to the new AMF 104.

In step 268, the new AMF 104 sends a Registration Accept message to the UE 100 indicating that the registration has been accepted. The Registration Accept message may include 5G-GUTI, Registration area, Mobility restrictions, PDU session status, NSSAI, MO-only mode Indicator, and/or periodic registration update timer. A 5G-GUTI is included if the new AMF 104 allocates a new 5G-GUTI. Mobility restrictions can be included in case mobility restrictions apply for the UE 100. The new AMF 104 can indicate the PDU session status to the UE 100. The UE 100 can remove any internal resources related to PDU sessions that are not marked active in the received PDU session status. If the PDU session status information was in the Registration Request, the new AMF 104 can indicate the PDU session status to the UE 100. The NSSAI includes the accepted S-NSSAIs.

Optionally, in step 270 the UE 100 sends a Registration Complete message to the new AMF 104 to acknowledge that a new 5G-GUTI was assigned.

Embodiments of the present disclosure relate to a variation and update with respect to the general registration procedure and the service request procedure described in TS 23.501. In particular, the update reflects the MICO mode description as described in Section 5.4.1.3 thereof. Further details are given below.

Figure 3A:
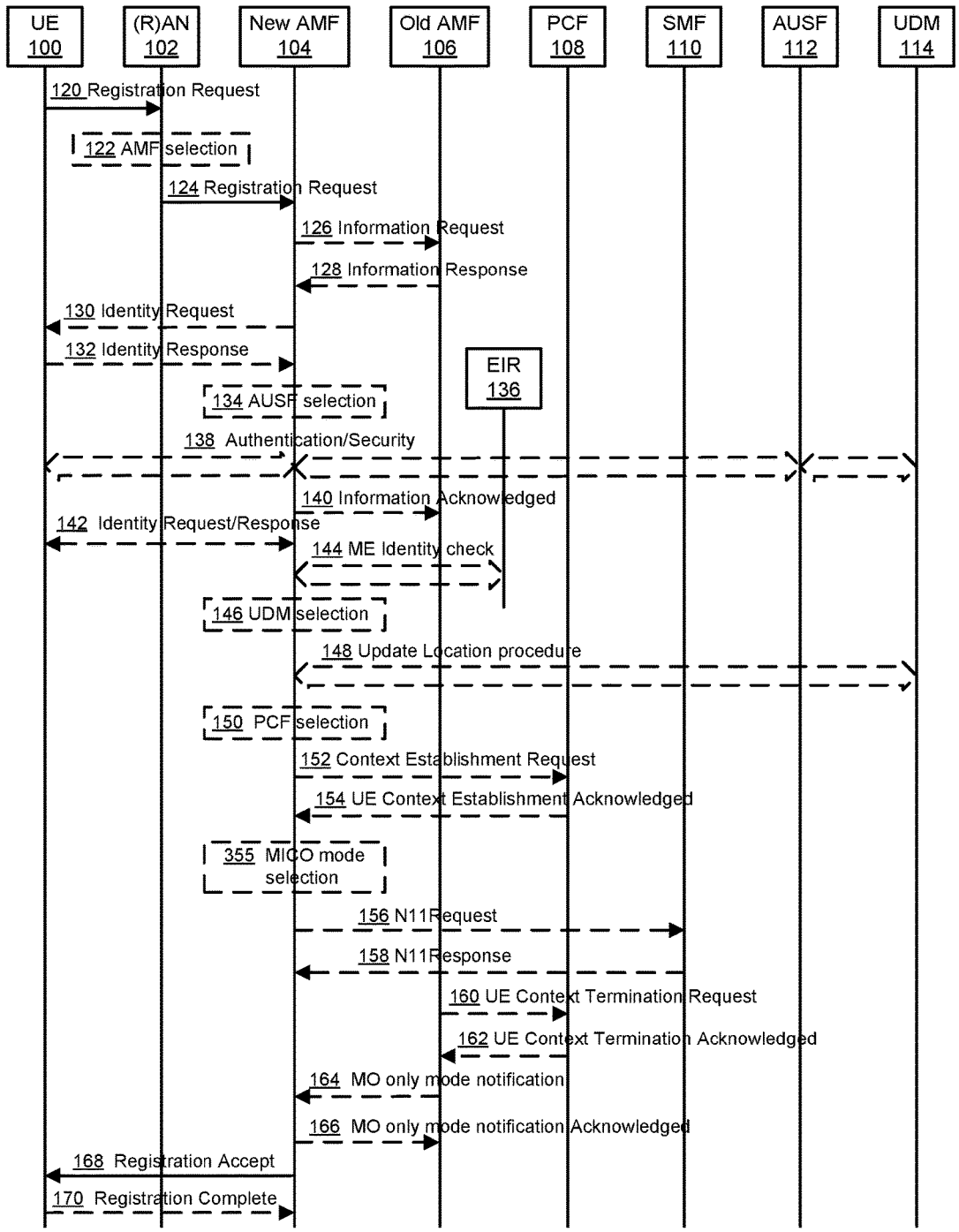
FIG. 3A presents a signaling diagram illustrating an embodiment of a procedure for updating a general UE registration procedure and service request procedure.
Figure 3B:
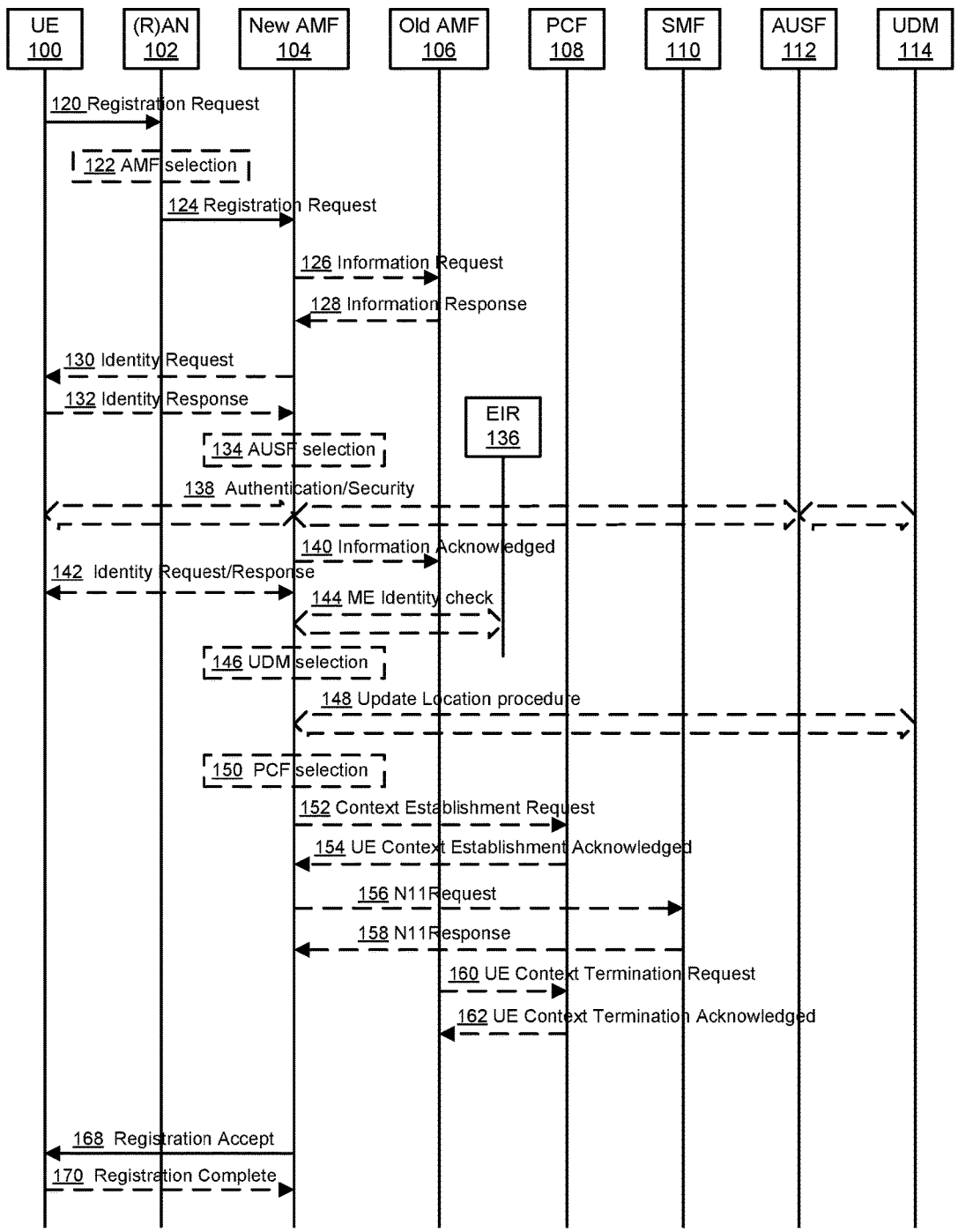
FIG. 3B presents a signaling diagram illustrating an embodiment of a procedure for updating a general UE registration procedure and service request procedure.
Figure 3C:
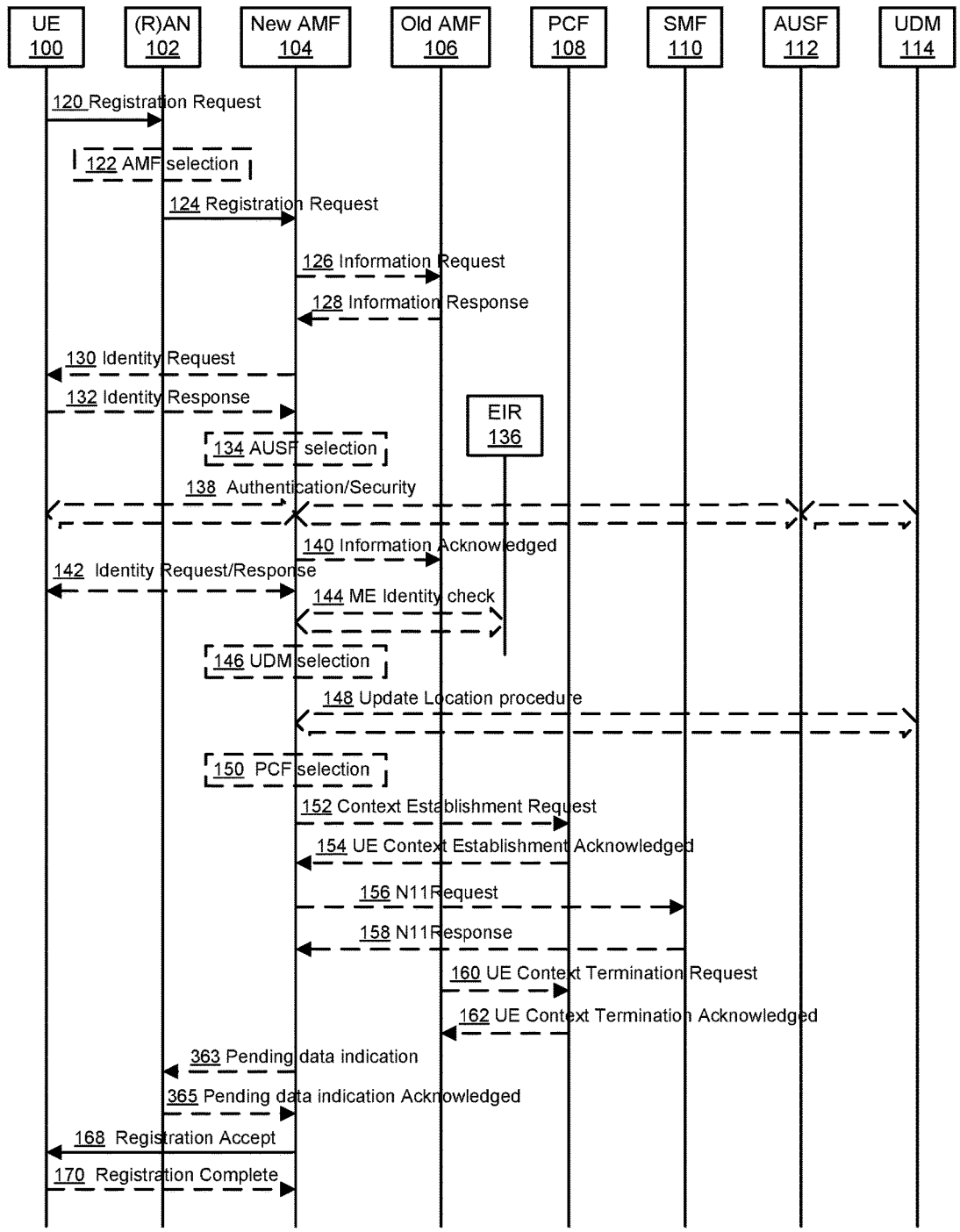
FIG. 3C presents a signaling diagram illustrating an embodiment of a procedure for updating a general UE registration procedure and service request procedure.

FIGS. 3A, 3B and 3C illustrate registration procedures and service request procedures provided in accordance with embodiments of the present invention. More specifically, FIGS. 3A, 3B and 3C provide signalling diagrams summarizing the steps of methods for general registration of a UE 100 in a communications network. It should be noted that the procedures in FIG. 1 and FIGS. 3A, 3B and 3C bear several similarities. As such, for purposes of clarity, only additional details particularly relevant to FIGS. 3A, 3B and 3C are provided in the description below. Other steps and details can be readily understood by referring to the above description with respect to FIG. 1.

In more detail, FIG. 3A further includes a MICO mode selection step 355 following UE context establishment steps 152, 154 and before N11 messages 156, 158. The AMF 104, based on local configuration and expected UE behaviour or Mobility Pattern, determines whether the MICO mode is allowed for the UE.

In step 168, the AMF 104 indicates, using the MO-only/MICO mode indicator, whether MICO mode is allowed for the UE 100, to the (R)AN 102 and/or the UE 100. The AMF 104 provides the periodic registration update timer value determined by it using the periodic registration update timer parameter.

In more detail, while FIG. 1 includes the MO-only mode notification 164 and MO-only mode notification acknowledgement 166, these operations are omitted in FIG. 3B.

With respect to FIG. 3B, in the registration request step 124, a MICO mode preference indicator is provided in the registration request. The MICO mode preference indicator indicates whether MICO mode is preferred or not. A UE 100 may indicate a preference for MICO mode during initial registration or a registration update. It may also indicate a preferred MICO mode duration. The registration request may include a communication duration value requested by the UE 100.

In addition, with respect to FIG. 3C, this embodiment is similar to that as discussed above with respect to FIG. 3B. However, the embodiment illustrated in FIG. 3C further includes two further optional steps 363 and 365 after UE Context Termination steps 160, 162 and before Registration steps 168, 170. Step 363 defines a pending data indication that is transmitted from the AMF 104 to the (R)AN 102. The (R)AN 102 may take this information into account when determining user inactivity. The AMF 104 can determine the Pending Data Indication message, as described in clause 5.4.1.3, TS 23.501. In Step 365 the (R)AN 102 can optionally send an Acknowledgment of receipt of the pending data indication to the AMF 104.

FIGS. 3A, 3B and 3C can be understood with reference to FIG. 1, with terms such as "MO-only" replaced with "MICO".

Operations supporting a UE-triggered service request in the connection management (CM)_IDLE state will now be described. These operations can include aspects supporting network slicing operations.

The Service Request procedure can be used by a UE 100 in the CM_IDLE state to request the establishment of a secure connection to an AMF 104. The UE 100 in the CM_IDLE state initiates the Service Request procedure in order to send uplink signalling messages, user data, and/or response to a network paging request. After receiving the Service Request message, the AMF 104 may perform authentication, and the AMF 104 may (e.g. if required for standards compliance) perform the security procedure. After the establishment of a secure signalling connection to an AMF 104, the UE 100 or network 818 may send signalling messages, e.g. PDU session establishment from UE 100 to the network 818. Alternatively, the SMF 110, via the AMF 104, may start the user plane resource establishment for the PDU sessions requested by the network 818 and/or indicated in the Service Request message.

For any Service Request, the AMF 104 may respond with a Service Response message to synchronize PDU session status between the UE 100 and the network 818. The AMF 104 may also respond with a Service Reject message to the UE 100, if the Service Request cannot be accepted by the network 818.

For a Service Request initiated due to the presence of user data, the network 818 may take further actions if user plane resource establishment is not successful.

It is noted that the procedure described here is not necessarily applicable for an access network 818 (once the UE 100 is registered in the network 818) in which the UE 100 is always considered to be in the CM_CONNECTED state and in which the user plane resource is always considered established for an active PDU session.

Figure 4:
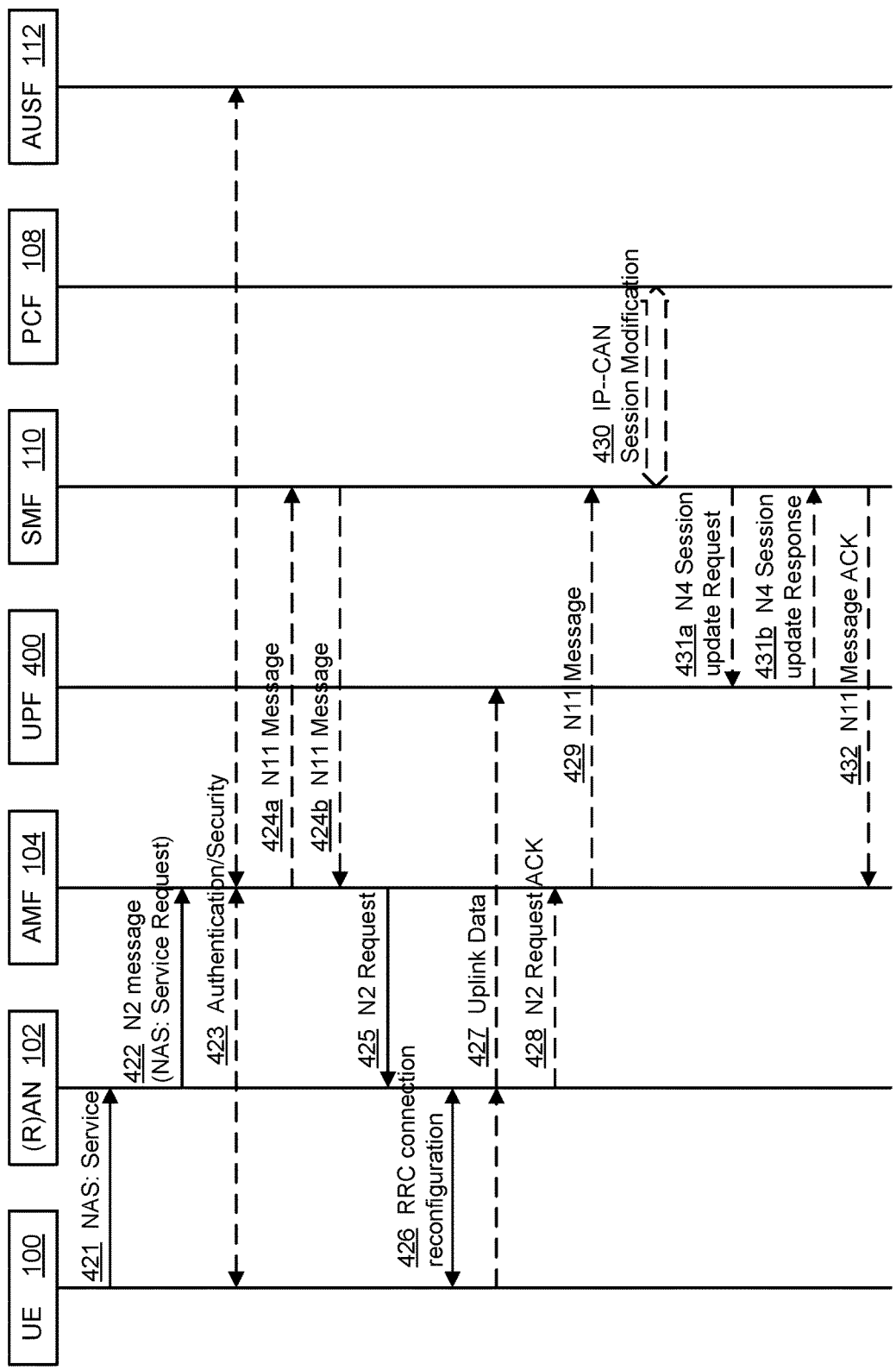
FIG. 4 presents a signaling diagram illustrating an embodiment of a UE-triggered service request procedure.

FIG. 4 illustrates a UE-triggered service request procedure provided in accordance with an embodiment of the present invention, which is described below.

In step 421 the UE 100 transmits a MM NAS Service Request to the (R)AN 102. The NAS Service request may indicate PDU session ID(s), security parameters, and/or PDU session status. The UE 100 sends the NAS message Service Request towards the AMF 104 encapsulated in an RRC message to the (R)AN 102. The RRC message(s) that can be used to carry the 5G-GUTI and this NAS message are described in 3GPP TS 38.331 and 3GPP TS 36.331.

If the Service Request is triggered for user data, the UE 100 includes the PDU session ID(s) in the NAS Service Request message to indicate the PDU session(s) that the UE 100 is to use. If the Service Request is triggered for signalling only, the UE 100 does not necessarily include any PDU session ID. When this procedure is triggered for paging response, if the UE 100 needs to use some PDU session(s), the UE 100 includes the PDU session ID(s) in the MM NAS Service Request message to indicate the PDU session(s) that the UE 100 needs to use. Otherwise the UE 100 does not necessarily include any PDU session ID.

It is noted that the PDU session status indicates the PDU sessions available in the UE 100.

In step 422, the (R)AN 102 transmits an N2 Message to the AMF 104. The N2 message includes an MM NAS Service Request, 5G-GUTI, Location information, RAT type, and/or RRC establishment cause. Details of this step are described in 3GPP TS 38.413. If the AMF 104 can't handle the Service Request it will reject it. The 5G-GUTI is obtained in RRC procedure in 3GPP TS 38.331. The (R)AN 102 selects the AMF 104 according to the 5G-GUTI. The Location Information and RAT type relates to the cell in which the UE 100 is camping. Based on the PDU session status, the AMF 104 may initiate PDU session release procedure if the PDU session is not available in the UE 104.

In step 423, if the Service Request was not sent integrity protected or integrity protection is indicated as failed, the AMF 104 initiates NAS authentication/security procedure as defined in clause 4.6 of TS23.502. If the UE 100 triggered the Service Request to establish a signalling connection only, after the security exchange the UE 100 and the network 818 can send signalling and the remaining steps illustrated in FIG. 4 are skipped.

In step 424a, which is a conditional step, the AMF 104 sends an N11 Message to the SMF 110. The message may include PDU session ID(s). If the MM NAS Service Request message includes PDU session ID(s), or this procedure is triggered by the SMF 110 but PDU session IDs from the UE 100 correlates to other SMFs 110 than the one triggering the procedure, the AMF 104 sends an N11 message to the SMF(s) 110 associated with the PDU session ID(s).

In step 424b, which is a conditional step, the SMF 110 sends an N11 Message to the AMF 104. The message may include N2 SM information such as quality of service (QoS) profile, and/or CN N3 Tunnel Info)). After receiving the N11 Message in step 424b, each SMF 110 sends an N11 Message to the AMF 104 to establish the user plane(s) for the PDU sessions. The N2 SM information contains information that the AMF 104 is to provide to the (R)AN 102.

In step 425, the AMF 104 sends an N2 Request to the AN 102. The N2 request indicates some or all of: an MT data indicator, N2 SM information received from SMF 110, security context, AMF Signalling Connection ID, a Handover Restriction List, and/or a MM NAS Service Accept message. The MT data indicator indicates that MT data will be triggered by MO data, and/or indicates that there is pending MT data or signalling in the network 818, as described in Section 5.4.1.3 in TS 23.501. In some embodiments, the MT data indicator includes an indication of a state transition timer or expected inactivity period.

In some embodiments, the state transition timer or the expected inactivity period are configured such that they are substantially infinite in time. This configuration of the state transition timer or the expected inactivity period can provide a means to inhibit the AN 102 from triggering an RRC release or N2 release.

The (R)AN 102 stores the Security Context, AMF Signalling Connection ID, QoS Information for the QoS Flows of the PDU Sessions that are activated, and/or N3 Tunnel IDs in the UE (R)AN context. Handover Restriction List is described in TS 23.501 [2] clause 5.3.4.1 "Mobility Restrictions".

The MM NAS Service Accept includes PDU session status in the AMF 104. The AMF 104 may be required to include at least one N2 SM information from the SMF 110, if the procedure is triggered for PDU session user plane setup. The AMF 104 may send additional N2 SM information from SMFs 110 in separate N2 message(s) (e.g. N2 tunnel setup request), if there is any. Alternatively, if multiple SMFs 110 are involved, the AMF 104 may send one N2 Request message to the (R)AN 102 after all the N11 messages from SMFs 110 are received. In such case, the N2 Request message includes the N2 SM information received in each of the N11 messages and information to enable the AMF 104 to associate responses to the relevant SMF 110.

In step 426, the (R)AN 102 and the UE 100 interact to performs an RRC Connection Reconfiguration operation involving the UE 100. This operation depends on the QoS Information for all the QoS Flows of the PDU Sessions activated and Data Radio Bearers. The user plane security is established at this step, which is described in detail in 3GPP TS 38.331 and 3GPP TS 36.331. The (R)AN 102 forwards the MM NAS Service Accept message to the UE 100. The UE 100 locally deletes the context of PDU sessions that are not available in 5G CN.

In step 427, after the user plane radio resources are setup, the uplink data from the UE 100 can now be forwarded to the (R)AN 102. The 5G (R)AN sends the uplink data to the UPF address and Tunnel ID provided in step 424.

In conditional step 428, the (R)AN 102 sends a N2 Request Acknowledgement message to the AMF 104. This message includes N2 SM information (e.g. (R)AN Tunnel info, List of accepted QoS Flows for the PDU Sessions activated, List of rejected QoS Flows for the PDU Sessions activated).

The message in step 428 may include N2 SM information (s), e.g. (R)AN tunnel information. The (R)AN 102 may respond N2 SM information with a separate N2 message (e.g. N2 tunnel setup response) if the AMF 104 sends a separate N2 message in step 425. If multiple N2 SM information is included in the N2 Request message in step 425, the N2 Request Acknowledgement in step 428 can include multiple N2 SM messages and information to enable the AMF 104 to associate the responses to relevant SMFs 110.

In conditional step 429, the AMF 104 sends an N11 Message to the SMF 110, per accepted PDU Session to the SMF 110. This message can include N2 SM information ((R)AN Tunnel info), and RAT Type. If the AMF 104 received N2 SM information (one or multiple) in step 428, then the AMF 104 may be configured to forward the N2 SM information to the relevant SMF 110. If the UE Time Zone has changed compared to the last reported UE Time Zone then the AMF 104 may include the UE Time Zone IE in this message.

In optional step 430, the SMF 110 interacts with the PCF 108 as follows. If dynamic PCC is deployed, the SMF 110 may initiate IP-CAN Session Modification and provides new location information to the PCF 108.

In conditional step 431*a*, the SMF 110 sends an N4 Session Update Request (indicating (R)AN tunnel info) to the UPF 400. If a user plane is to be setup or modified the SMF 110 initiates a N4 Session Modification procedure and provides (R)AN Tunnel Info.

In conditional step 431*b*, the UPF 400 sends an N4 Session Update Response to the SMF 110.

In conditional step 432, the SMF 110 sends an N11 Message Acknowledgement to the AMF 104.

Embodiments of the present disclosure relate to UE mobility, for example as it pertains to UE registration and connection management. A expected UE behaviour or mobility pattern is used to characterize and optimize the UE mobility. Aspects of the expected UE behaviour or mobility pattern that can be used according to various embodiments of the present disclosure are described below.

In some embodiments, MICO mode selection can be determined according to the UE expected UE behaviour or Mobility Pattern of the UE 100, as the expected UE behaviour or Mobility Pattern is described herein.

The expected UE behaviour or Mobility Pattern is a concept that may be used, for example by a 5G system CN or comparable system, to characterize and optimise the UE mobility. It describes the historical and/or expected mobility and network access activities of the UE 100. The CN can determine the expected UE behaviour or Mobility Pattern of the UE 100 based on subscription information for the UE 100, statistics of the UE mobility, network local policy, (R)AN assisted information, the UE assisted information, or a combination thereof. In some embodiments, a non-3GPP (R)AN 102 can provide information assisting in expected UE behaviour or Mobility Pattern determination.

The statistics of the UE mobility can include a historical or expected UE 100 moving trajectory. The statistics and/or trajectory can be provided from the application function (AF) to the AMF 104 via the PCF 108 or via the PCF 108 and the network exposure function (NEF). The (R)AN 102 provides information on serving access nodes of the UE 100 as (R)AN assisted information to the AMF 104. The UE 100 provides the UE type, UE location, stationary or not indication, MO-only mode preference as UE assisted information to the AMF 104. The subscription data in the UDM 114 includes communication pattern parameters. These may include, for example, whether periodic communication is performed or not, an indication of scheduled communication time(s), whether MICO is being employed or not, whether or not MT data is triggered by MO data, an expected time interval between MO data and MT data, and an indication of scheduled mobility location information. The AMF 104 may update the expected UE behaviour or Mobility Pattern if the (R)AN assisted information, the UE assisted information and/or the subscription data in the UDM 114 changes.

In various embodiments, the expected UE behaviour or mobility pattern can be used by the (e.g. 5G) system CN as an input to optimize mobility support provided to the UE 100. The mobility support can include some or all of the following: registration area list allocation; paging area management including limits paging to a sub area of the registration area; UE connection state management; MICO mode and periodic registration update timer management; UPF selection; and Handover (HO) and path switching management.

Embodiments of the present disclosure provide for a method and system for determining (e.g. by the AMF) whether MICO mode is allowed for a UE 100. The AMF 104 determines whether MICO mode is allowed for the UE 100 according to the expected UE behaviour or Mobility Pattern, which describes expected communication behaviour/activity of the UE 100. If the expected UE behaviour or Mobility Pattern indicates that there is no network-initiated communication for the UE 100, the MICO mode may be selected for the UE 100 and the periodic registration update timer can be set to have a large value. If the expected UE behaviour or Mobility Pattern indicates a scheduled network-initiated communication time, the MICO mode may be selected for the UE 100 and the periodic registration update timer may be set to have such a value that the timer will expire before the network-initiated communication takes place. If the expected UE behaviour or Mobility Pattern indicates uncertainty about network-initiated communication and/or its for the UE 100, the MICO mode may be refrained from being selected for the UE 100.

As used herein, the expected UE behaviour or Mobility Pattern potentially reflects to one or more of a variety of factors, including but not limited to geographic device mobility. The expected UE behaviour or mobility pattern can incorporate, for example, temporal communication patterns, temporal and geo-spatial communication patterns, relevant operator policy, UE 100 preferences, data volumes, or a combination thereof. The expected UE behaviour or mobility pattern may indicate the times and/or locations at which the UE is active. The expected UE behaviour or mobility pattern can reflect past and/or expected future behaviours of the UE 100. In some embodiments, certain selected parts of an overall expected UE behaviour or mobility pattern (e.g. the UE's communication pattern) can be used to determine or anticipate the UE's MICO mode selection and periodic registration update timer values.

When an MICO UE 100 is in the CM_CONNECTED state after it has sent MO Data, the UE 100 is kept in the CM_CONNECTED state until a state transition timer expires. Further, the network infrastructure may be configured to move the UE 100 into the CM_IDLE state sufficiently slowly that MT data can be delivered. If the expected UE behaviour or communication pattern or Mobility Pattern of an MICO UE 100 indicates that MT data is to be triggered by MO data, or that there is data or signalling pending in the network, the AMF 104 may indicate this to the (R)AN 102, for example, during a Service Request procedure. According to the indication, the (R)AN 102 determines whether and when to trigger RRC release or N2 release when lack of data activity is observed for the UE 100. In some embodiments, the UE 100 may notify the AMF 104 of the end of communication operations through an NAS message when it is in the CM_CONNECTED state, after it has finished communication.

In some embodiments, upon, for example as a result of, an end of communication notification from the UE 100, the AMF 104 triggers N2 release to move the UE 100 into the CM_IDLE state. The state transition timer is determined by the AMF 104 and indicated to the (R)AN 102 during the Service Request procedure message 425. The (R)AN 102 does not initiate RRC release after the UE 100 has sent MO data until the state transition timer expires.

According to various embodiments, operation with respect to the MICO mode, for example as previously described in TS 23.501 (Section 5.4.1.3) is described as follows.

A UE 100 may indicate preference for MICO mode during initial registration or during a registration update. The AMF 104, based on local confirmation and the expected UE behaviour or Mobility Pattern, determines whether MICO mode is allowed for the UE 100 and indicates it to the UE 100, together with the accordingly determined periodic registration update timer value, during the registration procedure.

If the expected UE behaviour or Mobility Pattern, as described in the subscription information, indicates that there is no non-MICO mode or no network-initiated communication for the UE 100, the MICO mode may be selected for the UE 100 and the periodic registration update timer can be set to have a large value. If the expected UE behaviour or Mobility Pattern, as described in the subscription information indicates Scheduled non-MICO activity and/or network-initiated communication time, the MICO mode may be selected for the UE 100 and the periodic registration update timer may be set to have such a value that the timer will expire before the network-initiated communication takes place. If the expected UE behaviour or Mobility Pattern, as described in the subscription information, indicates uncertainty about non-MICO activities and/or network-initiated communication and/or their schedule for the UE 100, the MICO mode may be refrained from being selected for the UE 100.

The UE 100 and CN can re-initiate or exit the MICO mode at subsequent registration signalling. If the MICO mode is not indicated explicitly in Registration, then both the UE 100 and the AMF 104 may be configured to refrain from using the MICO mode. The AMF 104 may provide a non-stoppable timer indication to a UE 100 in the MICO mode when providing the periodic registration update timer value to the UE 100. For example, the periodic registration update timer value and the non-stoppable timer indication may be sent to the UE 100 as part of the Registration Accept message 120 in the Registration procedure. If the non-stoppable timer indication is provided, the UE 100 keeps its periodic registration update timer running while in the CM_CONNECTED state and performs a periodic registration update when the timer expires, in order to re-negotiate the MICO mode and the periodic registration update timer value.

Thus, when the UE 100 receives the non-stoppable timer indication, the UE 100 does not reset the periodic registration update timer. Instead, upon receipt it sets the periodic registration update timer with the periodic registration update timer value and keeps the periodic registration update timer running until the non-stoppable timer indication is removed. Thus, if the UE 100 enters the CM_CONNECTED state, by way of non-limiting example to send data in the UL direction, the UE 100 will not restart the periodic registration update timer because of the non-stoppable timer indication. When the periodic registration update timer expires, the UE 100 performs a registration update. In the context of such registration update, the MICO mode and periodic registration update timer value negotiation may be repeated.

In some examples, as an alternative to the non-stoppable timer solution, the AMF 104 may update the periodic registration update timer value provided to the UE 100 through a UE configuration update procedure, such as is described in 3GPP TS 23.502, clause 4.2.4.2, when the UE is in the CM_CONNECTED state. During the update procedure, the AMF 104 sends the updated timer value to the UE 100 as one of the mobility management related parameters. When the UE 100 enters the CM_IDLE state, the UE 100 sets the periodic registration update timer using such updated timer value and performs a periodic registration update when the timer expires.

The AMF 104 can assign a registration area to the UE 100 during the registration procedure. When the AMF 104 indicates MICO mode to a UE 100, the registration area is not constrained by paging area size. The network, based on local policy, and subscription information, may decide to provide an "all PLMN" registration area indication to the UE 100. In that case, re-registration to the same PLMN due to mobility does not apply.

In one embodiment, the AMF 104 provides a registration area to the UE 100 in MICO mode. The registration area size may be bound to Mobility restrictions (i.e. the registration may be contained by the allowed area) and by requirements to perform tracking for the UE 100.

When the AMF 104 indicates MICO mode to a UE 100, the AMF 104 considers the UE 100 as always unreachable while in the CM_IDLE state. The CN rejects requests for downlink data delivery for an MICO UE 100 in the CM_IDLE state. The CN also defers downlink transport over NAS for SMS, location services, etc. The UE 100 in MICO mode is reachable for mobile terminated data or signalling when the UE 100 is in the CM_CONNECTED state for the PDU sessions that are resumed.

If the expected UE behaviour or communication pattern or Mobility Pattern of a MICO UE 100 indicates that MT data is to be triggered by MO data, the AMF 104 can indicate this to the (R)AN 102 using an MT data indicator during the procedures, such as Service Request procedure that moves the UE 100 from the CM_IDLE state into the CM_CONNECTED state. According to the MT data indicator, the (R)AN 102 decides whether and when to trigger RRC release or N2 release when lack of data activity is observed for the UE 100.

It is noted that the MT data indicator may include a state transition timer or an expected inactivity period indicative that the (R)AN 102 should not trigger RRC release or N2 release until the timer expires or the expected inactivity period is over. The MT data indicator may potentially include such a state transition timer or an expected inactivity period and the AMF 104 may determine the value of the state transition timer or the expected inactivity period.

In some examples, the AMF 104 may determine the value of the state transition timer and/or the expected inactivity period based on the expected UE behaviour, communication pattern and/or Mobility Pattern of the MICO UE 100. By way of non-limiting example, the timer value may be computed as a function of the time interval between sending MO data and receipt of MT data triggered by such MO data (which may be part of the communication pattern parameters) and/or the maximum MT or MO data transport delay, which may be obtained from a third party, including without limitation, an application server and/or application function. In some embodiments, the maximum MT or MO data transport delay is included in the time interval between sending MO data and the receipt of MT data triggered by MO data.

When the AMF 104 indicates MICO mode to a UE 100, the AMF 104 may allocate and provide an active timer value to the UE 100. The active timer value may be determined by the AMF 104 according to the expected UE behaviour, communication pattern and/or Mobility Pattern of the MICO UE 100, in a way that is similar and/or identical to the way the AMF 104 determines the state transition timer described above.

In some examples, the AMF 104 may provide the (updated) active timer value to the UE 100 when it enters the CM-CONNECTED state, by way of non-limiting example, during a service request procedure triggered by the UE 100.

In the present disclosure, the concepts of UL and MO communications are used interchangeably as are the concepts of DL and MT communications.

In some examples, the communication pattern information, the expected UE behaviour information and/or the Mobility Pattern information may be provided by a third party, by way of non-limiting example, by an AF.

The active timer value may in some examples be equal to the state transition timer value. In some examples, the active timer value is a function of the state transition timer value. In some examples, the state transition timer value is a function of the active timer value.

The UE 100 may request an active timer value from the AMF 104, by way of non-limiting example, when the UE 100 indicates a MICO mode preference to the AMF 104. If an active timer value is requested by the UE 100, the AMF 104 may take the requested active timer value into account when determining the active timer value actually allocated to the UE 100. The AMF 104 may also take the requested active timer value into account when determining a value for the state transition timer. In some examples, when an active timer value is requested by the UE 100, it implicitly indicates that MICO mode is preferred by the UE 100, and in that case, the MICO preference indication from the UE 100 may be omitted.

Before the UE 100 transitions to the CM_IDLE state, the UE 100 may set an active timer using the active timer value and only enter the CM_IDLE state only after expiration of the active timer. During the period before expiry of the active timer, the UE 100 remains in the CM_CONNECTED state, and the UE 100 may stop and/or reset the active timer if it has MO data to send and/or if it receives MT data.

In some examples, the (R)AN 102 may determine a data inactivity timer value and set a data inactivity timer using such value. The data inactivity timer is used to detect data inactivity at the UE 100. If no data activity is detected before the expiry of the data inactivity timer, the (R)AN 102 may consider that the UE 100 has no data activity and then starts to set the state transition timer. Upon expiry of the state transition timer, the (R)AN 102 may trigger RRC release and/or N2 release. The (R)AN 102 may stop the data inactivity timer and the state transition timer at any time if it detects data activity for the UE 100.

The (R)AN 102 may notify the UE 100 of the data inactivity timer value, including, without limitation, during RRC procedures. The UE 100 may use the data inactivity timer value to set a local data inactivity timer to determine data inactivity for itself in a manner similar and/or identical to the way that the (R)AN 102 determines the data inactivity of the UE 100 described above. Upon expiry of the data inactivity timer, the UE 100 may decide to transition to the CM_IDLE state. Before entering the CM_IDLE state, the UE 100 may use the active timer value received from the AMF 104 to set the active timer.

A UE 100 in MICO mode may notify the AMF 104 to indicate the end of communication through NAS message when it is in the CM_CONNECTED state, after it has finished communication. Upon end of communication notification from the UE 100, the AMF triggers N2 release to move the UE into the CM_IDLE state.

In various embodiments, a UE 100 in MICO mode performs periodic registration at the expiration of the periodic registration update timer.

In various embodiments, a UE 100 in MICO mode need not listen to paging while in the CM_IDLE state. A UE 100 in MICO mode may stop any access stratum procedures in the CM_IDLE state, until the UE 100 initiates CM_IDLE to CM_CONNECTED state transition procedures due to one or more of the following triggers: a change in the UE 100 (e.g. change in configuration) requires an update its registration with the network; a periodic registration update timer expires; MO data is pending; and/or MO signalling is pending (e.g. a SM procedure is initiated).

In various embodiments, if a registration area that is not the "all PLMN" registration area is allocated to a UE 100 in MICO mode, then the UE 100 determines if it is within the registration area or not when it has MO data or MO signalling.

In some embodiments, the AMF 104 indicates to the (R)AN 102 that the UE 100 is in MICO mode.

In one embodiment, for indicating the state transition timer or the expected inactivity period to the (R)AN 102, the AMF 104 may inform the (R)AN 102 of the state transition timer or the expected inactivity period during a registration procedure, for example at the same time that it indicates the UE's MICO mode to the (R)AN 102, or by way of a separate step. Later, during the service request procedure, the AMF 104 updates the (R)AN 102 with the timer value or the inactivity period value (e.g. only) when the timer value or the inactivity period value changes, for example, due to UE's communication pattern change.

Continuing with the above embodiment, the AMF 104 determines the state transition timer or the expected inactivity period for a MICO UE 100 according to the communication pattern indicated by the user subscription data or the UE's expected UE behaviour or mobility pattern. If the communication pattern indicates that MO data will not trigger MT data, the timer or the period may be assigned a pre-configured default value. If the communication pattern indicates that MO data will trigger MT data and the expected time interval between MT data and MO data, the timer or the period may be set to have a value not smaller than the sum of that time interval and the estimated round trip delay of a packet. The estimated round trip delay may be configured in the AMF 104 or retrieved by the AMF 104 from an external data storage. If the information of that time interval is not available, a configured default value will be applied in the timer or period value determination.

Continuing with the above embodiment, if the AMF 104 does not inform the (R)AN 102 of the state transition timer or the expected inactivity period, the (R)AN 102 may not initiate or may be configured to avoid initiating RRC release and/or avoid requesting for N2 release. As such, the state transition timer can be enforced even if the (R)AN 102 is unaware of it. The (R)AN 102 may notify or may however be configured to notify the AMF 104 regarding the end of MO data activity so that the AMF 104 can determine when to trigger N2 release (thus moving the UE from the CM_CONNECTED state to the CM_IDLE state).

Figure 5:
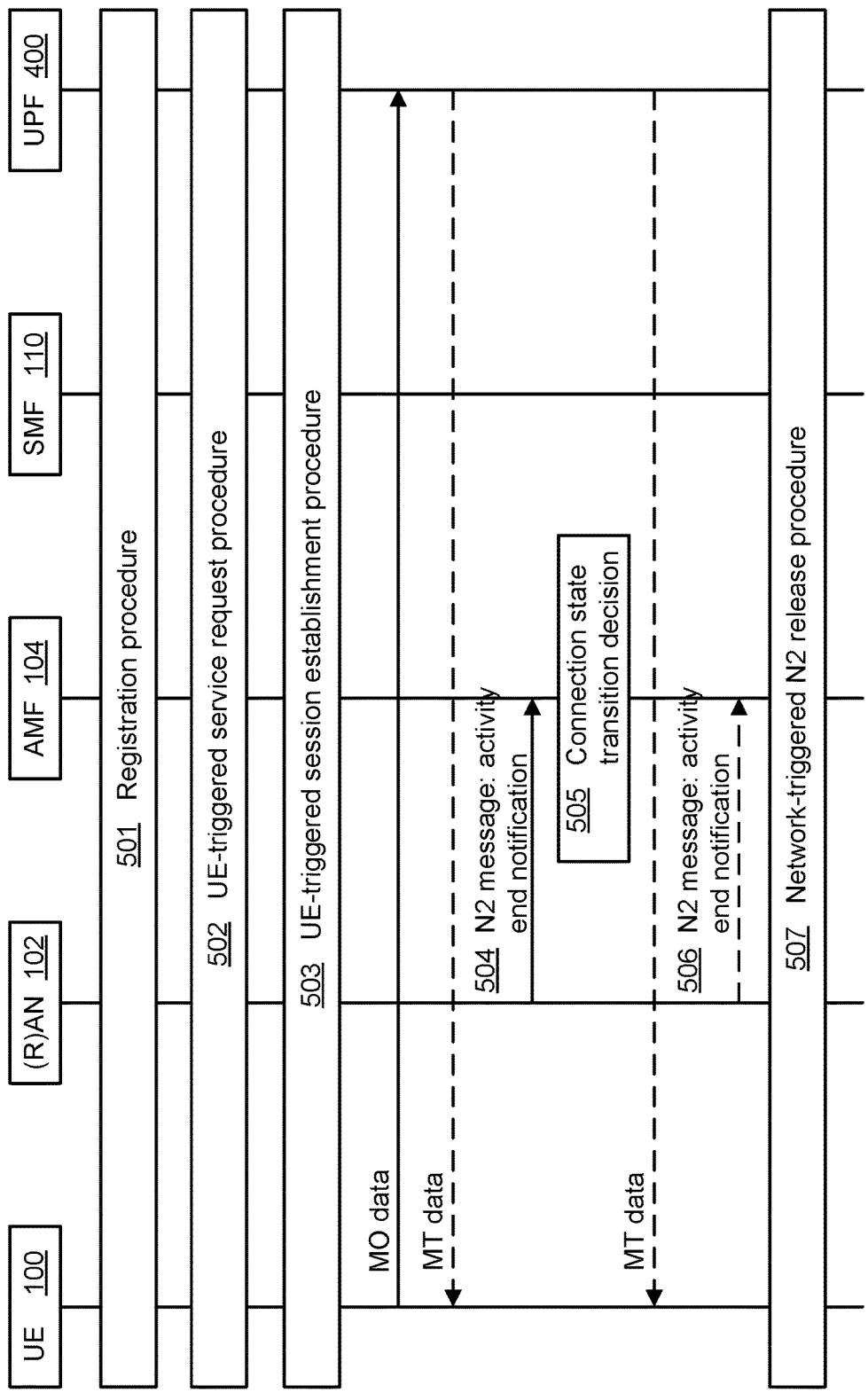
FIG. 5 presents a signaling diagram illustrating an embodiment of an AMF-centric state transition procedure.

FIG. 5 describes the AMF-centric state transition procedure, according to an embodiment of the present invention.

In step 501, the UE 100 performs registration with the network. During the registration procedure, the UE 100 is notified about its MICO mode assignment and periodic registration update timer, as described in clause 4.2.2.2.2 in TS23.502. At this step, the (R)AN 102 may also be notified about the UE's MICO mode assignment. At this step a PDU session can be activated and upon completion of this step the UE 100 may enter the CM_CONNECTED state.

In some embodiments, in step 502, when the UE 100 has MO data in the CM_IDLE state, it initiates the service request procedure to enter the CM_CONNECTED state, as described in clause 4.2.3.2 in TS23.502. A PDU session can be activated at this step. It would be understood that step 502 can be optional as this transition of the UE 100 to the CM_CONNECTED state may occur automatically upon completion of step 501 as noted above.

In step 503, the UE 100 requests to establish a PDU session for the MO data, as described in clause 4.3.2.2 in TS23.502, if no PDU session is activated at step 501 or step 502.

In step 504, the (R)AN 102 notifies the AMF 104 that MO activity finished using N2 message. If MT activity also finished, the (R)AN 102 notifies the AMF 104 at the same time.

In step 505, the AMF 104 determines whether and/or when to move the UE 100 into the CM_IDLE state and sets up the state transition timer or the expected inactivity period, as described in clause 5.4.1.3 in TS23.501.

In step 506, the (R)AN 102 notifies the AMF 104 about the end of MT activity using N2 message.

In step 507, when the AMF 104 is notified about end of MT activity (step 505) or when the state transition timer expires or when the expected inactivity period is over, the AMF 104 initiates the N2 release procedure to move the UE 100 into the CM_IDLE state and at the same time deactivates PDU sessions.

A MICO UE 100 in the CM_CONNECTED state may request a transition to the CM_IDLE state, for example, after the UE 100 finishes receiving MT data. To support same, the UE 100 may send an NAS message to the AMF 104 to indicate the intention of going idle, which then triggers N2 release. The UE 100 may also interact with the (R)AN 102 to release RRC, which will result in the (R)AN 102 requesting the AMF 104 to perform N2 release and thus move the UE 100 from the CM_CONNECTED state into the CM_IDLE state. When N2 is released, the UE 100 enters the CM_IDLE state.

Figure 6:
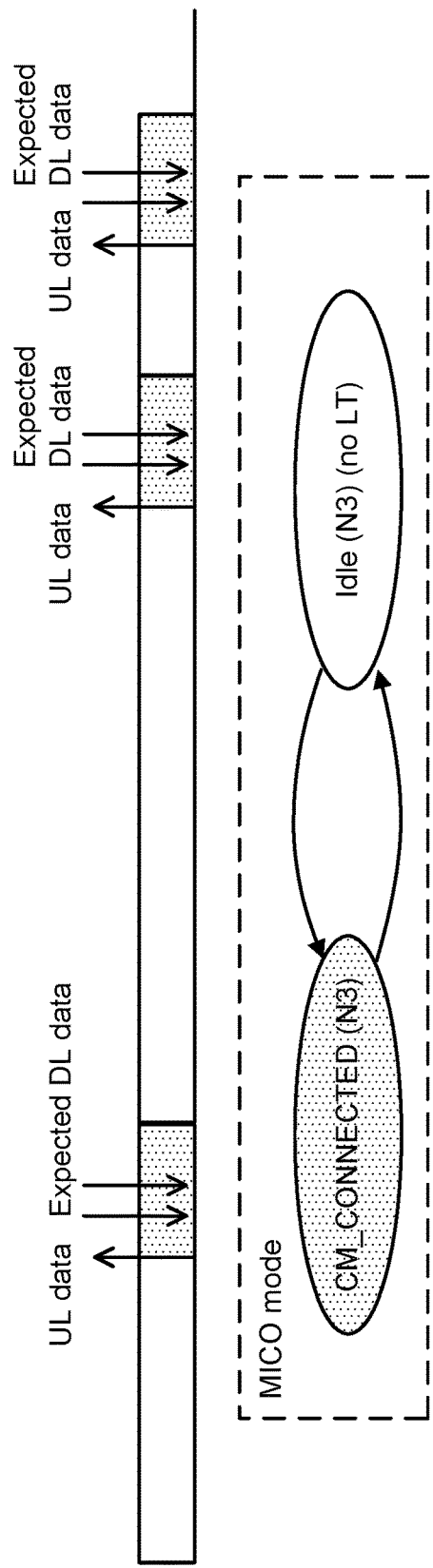
FIG. 6 presents UL-triggered DL transmission when a UE is in MICO mode according to embodiments of the present invention.

FIG. 6 illustrates uplink-triggered downlink transmission for a UE 100 in MICO mode, according to another embodiment of the present disclosure. Location tracking of a device (UE) may be performed for a short or limited period of time after the device sends uplink (UL) data so that DL packets can be delivered to the UE 100. The DL packets may be triggered by transmission of the UL packets. This can be referred to as on-demand location tracking (LT).

With reference to FIG. 6, triggering of a CN state transition from a CM_IDLE state (where LT is not performed for the UE 100) to a CM_CONNECTED state (where LT is performed for the UE 100) may be based on the occurrence of UL data being transmitted by a UE 100 and/or an associated NAS service request. Triggering of the CN state transition from the CM_CONNECTED state to the CM_IDLE state may be device-triggered or network-triggered. A device-triggered transition may be based on an occurrence of number of DL packets or DL application messages (pre-configured or on-line configured to device), or based on a time window (pre-configured or on-line configured to device). The trigger may be pre-configured for the device or configured through an on-line configuration operation involving the device. The time window may reflect the (e.g. expected) duration of DL activity, for example. The duration of this time window can be referred to as the window open width. A network-triggered transition may be a NAS-triggered transition (for example in which the AMF 104 obtains the pre-configuration of the device's window open width), or a (R)AN-triggered transition (for example in which the (R)AN 102 obtains the pre-configuration of the device's window open width).

Pre-configuration can refer to UE configuration by a management function or UE configuration during manufacture, for example. On-line configuration can refer to over-the-air programming, setting of configuration register information by management signaling, receiving configuration information from the AMF 104, etc.

CN-assisted (R)AN parameter tuning aids the (R)AN 102 to minimize the UE state transitions and to achieve optimum network behaviour. CN assistance information may be derived by the AMF 104, per UE 100 in the AMF 104, based on a collection of UE behaviour statistics, UE assistance information (as described below), or other available information about the communication pattern or expected UE behaviour (such as a subscribed data network name (DNN), international mobile subscriber identity (IMSI) ranges, or other subscription information). If the communication pattern parameters of the UE 100 are available, the AMF 104 may use this information when selecting the CN-assisted (R)AN parameter values. If the AMF 104 is able to derive the communication pattern or expected UE behaviour or Mobility Pattern of the UE 100 (as described in clause 5.3.4.2 of TS 23.501), the AMF 104 may take the communication pattern or expected UE behaviour or Mobility Pattern information into account when selecting the CN-assisted (R)AN parameter values.

The communication pattern parameters and the expected UE behaviour or Mobility Pattern information may be used by the AMF 104 as input to derive the CN-assisted (R)AN parameter values. In the case of statistics-based CN assistance information collection, this may be enabled based on a local configuration (e.g. a subscribed DNN, IMSI ranges or other subscription information). The CN assistance information provides the (R)AN 102 with a way to understand the UE behaviour for "Expected UE activity behaviour" and for "Expected HO behaviour". "Expected UE activity behaviour" may include the expected pattern of the UE's changes between the CM_CONNECTED and CM_IDLE states. This may be derived, for example, from the communication pattern parameters of the UE 100. The (R)AN 102 may use this information, together with other information such as a Pending Data Indication from the AMF 104, to determine user inactivity. "Expected HO behaviour", may include the expected target (R)AN 102 nodes within a certain time window, and the expected interval between inter-(R)AN handovers. This may be derived, for example, from the communication pattern or expected UE behaviour or Mobility Pattern information of the UE 100. The (R)AN 102 may use this information to perform a "make before break" during a hand over procedure, which allows the UE 100 to be connected to both the source (R)AN node and the target (R)AN node at the same and achieves zero handover delay.

The AMF 104 determines when to send this information to the (R)AN 102 as "Expected UE behaviour" carried in N2 signalling over the N2 interface. The information is sent to the (R)AN 102 during Registration or Service Request procedures. It should be noted that the calculation of the CN assistance information (i.e. the algorithms used and the related criteria), and the decision when it is considered suitable and stable to send the information to the (R)AN 102, may be implementation-specific. Unreliable information should not be provided to the (R)AN 102 as it may drive undesirable system effects.

A UE-assisted connection management may complement the CN-assisted (R)AN parameter tuning approach. The AMF 104 may use UE assistance information when selecting CN-assisted (R)AN parameter values, especially when the UE's communication pattern parameters are not available (e.g. when it is not provided as part of subscription information). For example, the UE 100 may provide an communication duration value, which indicates the expected duration of UE communication activity to the AMF 104. The AMF 104 determines the "Expected UE activity behaviour" accordingly and informs the relevant CN-assisted (R)AN parameter values to the (R)AN 102. If the communication duration was over-estimated by the UE 100, the UE 100 may send an "End of communication" notification to the AMF 104 for correction after the UE 100 finishes its activity. The AMF 104 takes this information into account when determining a network-triggered UE context release, i.e. to transition the UE 100 from the CM_CONNECTED state to the CM_IDLE state.

UE-assisted connection management aids the CN to minimize the UE state transitions and to achieve optimum network behaviour. A UE 100 may request a communication duration value during Registration or Service Request procedures. The UE request communication duration value may be included in the Registration Request message 120 or in the Service Request message 421 (or NAS message 422). The UE requested value indicates the expected duration of communication activity from the UE's perspective. The AMF 104 determines the communication duration value that is allocated to the UE 100.

When determining the communication duration value that is allocated to the UE 100, the AMF 104 may receive as input the UE requested communication duration value and a collection of UE behaviour statistics, or other available information about the communication pattern or expected UE behaviour (such as subscribed DNN, IMSI ranges, communication pattern parameters, or other subscription information). If the AMF 104 determines to allocate a communication duration value to the UE 100, the AMF 104 may provide the communication duration value to the UE 100 through Registration signalling (e.g., as part of the Registration Accept message 168), Service Request signalling (e.g., as part of a Service Request Accept message 425 or 426), or UE Configuration Update signalling (e.g., as part of the UE configuration to be updated). A UE 100 may change the communication duration value to a new value, e.g. when the conditions are changed in the UE 100, by requesting the new value in Registration or Service Request procedures (through the Registration Request message 120 or the Service Request message 421 (or NAS message 422), respectively). If a communication duration value is allocated to the UE 100, the AMF 104 may take the communication duration value into account when determining the "Expected UE activity behaviour" as CN-assisted (R)AN parameter values (as described above), and the UE 100 may start a communication activity timer with the communication duration value when transitioning from the CM_IDLE state to the CM_CONNECTED state. If the communication activity timer has not expired when the UE 100 completes its communication activity, the UE 100 may send an "End of communication" notification to the AMF 104. The AMF 104 may take this information as input when determining a network-triggered UE context release in the (R)AN 102, i.e. to transition the UE 100 from the CM_CONNECTED state to the CM_IDLE state. The UE 100 may stop the communication activity timer, if running, when a transition to the CM_IDLE state is made.

Figure 7:
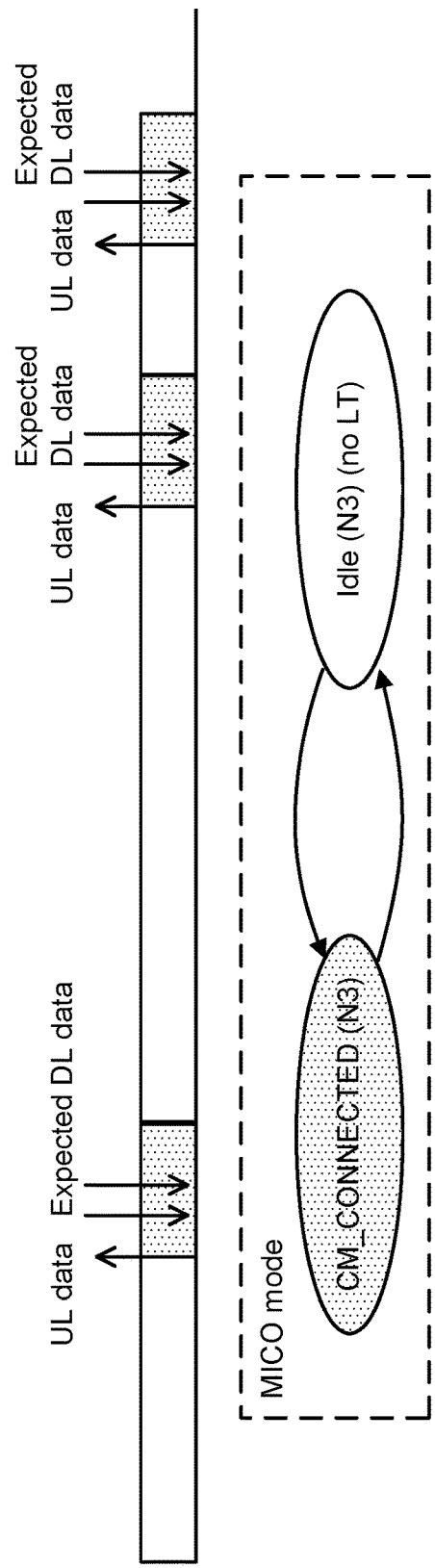
FIG. 7 presents operation in relation to a known short DL transmission schedule according to embodiments of the present invention.

FIG. 7 illustrates operation in relation to a known short DL transmission schedule, according to another embodiment of the present invention. This may facilitate location tracking of a device being performed before the DL transmission schedule and lasting until the completion of the short DL data transmission.

According to embodiments and with reference to FIG. 7, a device is assumed to be switched to Non-MICO mode and in CM_CONNECTED state for DL data reception. After the data reception, the device is switched back to MICO CM_IDLE state.

To provide for a MICO to Non-MICO transition, the device is triggered by sending a location update NAS message at a time that is pre-configured according to a time schedule. The time schedule can be set off-line or online. The device may be triggered by sending de-MICO mode registration (e.g. via NAS).

To provide for a non-MICO to MICO transition and/or to provide for a CM_CONNECTED to CM_IDLE state transition for a MICO mode device (see e.g. FIG. 7), for device triggering, the device may be triggered by occurrence of a predetermined number of DL application packets. The number may be pre-configured or configured by an on-line interaction with the device. Alternatively, the device may be triggered in accordance with a time window, which is pre-configured or configured by an on-line interaction with the device.

To provide for a non-NICO to NICO transition, for network triggering, NAS triggered or (R)AN triggering can be used. NAS triggering can be pre-configured for example using operations involving the AMF 104. For (R)AN 102 triggering, the (R)AN 012 may obtain pre-configuration information indicative of the device's window open width. As previously noted, the window open width can refer to the duration of a time window during which the device can receive DL packets, e.g. following an UL transmission. This may be the duration in which the device remains in Non-NICO mode following an UL transmission, for example.

According to embodiments, the transition between NICO mode and non-MICO mode is based on whether there are network-initiated communication operations pending for the UE 100. The transition can be based on the schedule of network-initiated communication operations, for example, it is desired that the UE 100 enters non-NICO mode before a network-initiated communication activity happens, since the data will not be delivered to the UE 100 if it is in NICO mode as the UE 100 is not tracked when it is in NICO mode. According to embodiments, upon completion of the network-initiated communication, the UE 100 returns to NICO mode again. As such, according to embodiments, two types of windows are provided, namely a first window where no network-initiated communication is expected and a second window where network-initiated communication is expected. It will be understood that the size of the first and second window can vary over time, for example window size can be based on the communication schedule or schedule update or other aspect.

Those skilled in the art will appreciate that at times nodes or functions are described as communicating with each other. It should be understood that this term can comprise both uni- and bi-directional communication. As such, communication should be understood to include at least one of transmitting and receiving messages or communications from another node. It should also be understood that in the above description there has been reference to individual steps. In an alternate explanation, each step may be understood as transmitting or receiving a message, or carrying out an internal process. Thus, for example, where reference is made to, for example, step 120, it could alternately be understood as the UE 100 transmitting a registration request 120 to (R)AN 102.

FIG. 8 is a block diagram of a computing system 800 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 800 typically includes a processor, such as a central processing unit (CPU) 802, a bus and a memory 808, and may optionally also include a mass storage device 804, a video adapter 810, and an I/O interface 812 (shown in dashed lines).

The processor 802 may comprise any type of electronic data processor. The memory 808 may comprise any type of non-transitory system memory such as static random access memory (SRAM), dynamic random access memory (DRAM), synchronous DRAM (SDRAM), read-only memory (ROM), or a combination thereof. In an embodiment, the memory 808 may include ROM for use at boot-up, and DRAM for program and data storage for use while executing programs. The bus may be one or more of any type of several bus architectures including a memory bus or memory controller, a peripheral bus, or a video bus.

The mass storage 804 may comprise any type of non-transitory storage device configured to store data, programs, and other information and to make the data, programs, and other information accessible via the bus. The mass storage 804 may comprise, for example, one or more of a solid state drive, hard disk drive, a magnetic disk drive, or an optical disk drive. In some embodiments, mass storage 804 may be external to the computing system 800 and accessed through either I/O interface 812 or network interface 806.

The video adapter 810 and the I/O interface 812 provide optional interfaces to couple external input and output devices to the computing system 800. Examples of input and output devices include a display 814 coupled to the video adapter 810 and an I/O device 816 such as a touch-screen coupled to the I/O interface 812. Other devices may be coupled to the computing system 800, and additional or fewer interfaces may be utilized. For example, a serial interface such as Universal Serial Bus (USB) (not shown) may be used to provide an interface for an external device.

The computing system 800 may also include one or more network interfaces 806, which may comprise wired links, such as an Ethernet cable, and/or wireless links to access one or more networks 818. The network interfaces 806 allow the computing system 800 to communicate with remote entities via the networks 818. For example, the network interfaces 806 may provide wireless communication via one or more transmitters/transmit antennas and one or more receivers/receive antennas. In an embodiment, the computing system 800 is coupled to a local-area network or a wide-area network for data processing and communications with remote devices, such as other processing units, the Internet, or remote storage facilities. In another embodiment, computing system 800 is hosted within a data center, and network interface 806 can be used to communicate over a high speed external bus to other data center functions including storage functions.

When embodied as a node within a data center, computing system 800 may be a virtual entity created using resources within the data center. In such a case, the elements described above, may be virtualized entities created to represent a physical analog to the virtualized computing system.

When discussed in the context of a data center, it should also be understood that optional elements such as a video adapter 810 and I/O interface 812 may not be present (thus being indicated as optional). Within a data center it is common for servers to be installed in a so-called headless configuration where they do not have standard I/O interfaces 812 or the ability to connect a display directly to a video adapter 810. In such embodiments, operation and configuration of the computing system is often done through a remote access functionality routed through the network interface 806.

Embodiments of the present invention may be implemented using computing, communication and/or memory devices. Computing devices used to implement method operations may include a processor operatively coupled to memory, the memory providing instructions for execution by the processor to perform the method as described herein. Embodiments of the present invention may be implemented at least in part using computing devices such as Application Specific Integrated Circuits, microcontrollers, and digital logic circuits. Embodiments of the present invention may be directed to improving internal operations of the communication network.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Further details of solutions supporting mobile devices utilizing a mobile-initiated communication mode are included as Appendices A to N, which are incorporated by reference herein in their entirety.

According to a first aspect, there is disclosed a method for connecting a UE to a network, the method comprising receiving, at an AN, from a UE, a registration request comprising a MO mode preference and transmitting, from the AN, the registration request to a core AMF.

In an embodiment, the MO mode preference can be MO only preferred. In an embodiment, the registration request can additionally comprise a suggested duration for the MO only preference.

According to a second aspect, there is disclosed an AN comprising a radio access interface, a network interface, a processor and a memory. The radio access interface is for communicating with a UE. The network interface is for communicating with nodes within a (R)AN and a CN. The memory is for storing instructions that when executed by the processor, cause the AN to carry out the method(s) of the first aspect.

According to a third aspect, there is disclosed a method for connecting a UE to a network, the method comprising receiving, at an AMF, from an AN, a request to register a UE, said request including a MO mode preference and transmitting an indication of registration acceptance towards the UE.

In an embodiment, the MO mode preference can be MO only preferred. In an embodiment, the registration request can additionally comprise a suggested duration for the MO only preference. In an embodiment, the UE can be previously served by another AMF and the method can additionally comprise requesting information from the previous AMF and receiving the requested information to complete the registration request.

According to a fourth aspect, there is disclosed an apparatus comprising a network interface, a processor and a memory. The network interface is for communicating with nodes within a (R)AN and a CN. The memory is for storing instructions that when executed by the processor cause the apparatus to carry out the method(s) of the third aspect.

According to a fifth aspect, there is disclosed a method for connecting a UE to a network, the method comprising transmitting, from the UE, a registration request to an AN available on the network, the registration request comprising a MO mode preference and receiving, from an AN at the UE, a registration acceptance from a core AMF indicating an MO mode.

In an embodiment, the MO mode preference can be preferred. In an embodiment, the registration request can additionally comprise a suggested duration for the preference. In an embodiment, the registration request can additionally comprise a suggested duration for the preference. In an embodiment, the method can be repeated after the suggested duration has expired.

According to a sixth aspect, there is disclosed an electronic device comprising a (R)AN interface, a processor and a memory. The (R)AN interface is for wirelessly communicating with an AP. The memory is for storing instructions that when executed by the processor cause the electronic device to carry out the method(s) of the fifth aspect.

In an embodiment, the electronic device can be a UE.

According to a seventh aspect, there is disclosed a processor and a machine-readable memory. The machine readable memory is for storing machine executable instructions which when executed by the processor configure the UE to, upon transmitting MO data, transition to a CN connected state and remain in the CN connected state until a predetermined condition is met, wherein the UE is capable of receiving MT data while in the CN connected state.

According to an eighth broad aspect, there is disclosed an AN comprising a processor and a machine-readable memory. The machine readable memory is for storing machine executable instructions which when executed by the processor configure the AN to, upon receiving MO data from a UE and prior to a predetermined expiry condition being met, initiate tracking of the UE, and transmit MT data toward the UE based on information derived from the tracking.

According to a ninth broad aspect, there is disclosed a UE comprising a processor and a machine-readable memory. The machine readable memory storing machine executable instructions which when executed by the processor configure the UE to perform a network registration operation in response to a trigger, and receiving instructions to transition between a MICO mode and a non-MICO mode upon completion of network registration.

In an embodiment, the trigger can be indicative of expiry of a periodic registration timer. In an embodiment, the trigger can be indicative of an expected network-initiated communication of MT data to the UE. In an embodiment, the trigger can be dynamically updated.

According to a tenth aspect, there is disclosed a method for connecting a UE to a network, the method comprising receiving, at an AN, from a UE, a registration request comprising a MO only mode preference, and transmitting, from the AN, the registration request to a core AMF.

In an embodiment, the registration request can additionally comprise a suggested duration for the MO only mode preference.

According to an eleventh aspect, there is disclosed an AN comprising a radio access interface, a network interface, a processor and a memory. The radio access interface is for communicating with a UE. The network interface is for communicating with nodes within a (R)AN and a CN. The memory is for storing instructions that when executed by the processor cause the AN to carry out the method(s) of the tenth aspect.

According to a twelfth aspect, there is disclosed a method for connecting a UE to a network, the method comprising receiving, at an AMF, from an AN, a request to register a UE, said request including a MO only mode preference; and transmitting an indication of registration acceptance towards the UE.

In an embodiment, the registration request can additionally comprise a suggested duration for the MO only mode preference. In an embodiment, the UE can be previously served by another AMF and the method can additionally comprise requesting information from the previous AMF, and receiving the requested information to complete the registration request.

According to a thirteenth aspect, there is disclosed an apparatus comprising a network interface, a processor and a memory. The network interface is for communication with nodes within a (R)AN and a CN. The memory can be for storing instructions that when executed by the processor cause the apparatus to carry out the method(s) of the twelfth aspect.

According to a fourteenth aspect, there is disclosed a method for connecting a UE to a network, the method comprising transmitting, from the UE, a registration request to an AN available on the network, said registration request comprising a MO only mode preference; and receiving from an AN at the UE, a registration acceptance from a core AMF indicating an MO only mode.

In an embodiment, the registration request can additionally comprise a suggested duration for the MO only mode preference. In an embodiment, the method can be repeated after the suggested duration has expired.

According to a fifteenth aspect, there is disclosed an electronic device comprising a (R)AN interface, a processor and a memory. The (R)AN interface is for wirelessly communicating with an AP. The memory is for storing instructions that when executed by the processor cause the electronic device to carry out the method(s) of the fourteenth aspect.

In an embodiment, the electronic device can be a UE.

According to a sixteenth aspect, there is disclosed a method comprising sending an indicator to a UE in a MICO mode, the indicator for disabling a trigger of a periodical registration timer reset by at least one of UL traffic transmission and a UE transition to a CM-CONNECTED state.

In an embodiment, the method can further comprise allocating a communication duration value to the UE and sending the communication duration value to the UE. In an embodiment, the communication duration value can be based on a UE requested communication duration value.

According to a seventeenth aspect, there is disclosed a method comprising receiving an indicator from an AMF while in a MICO mode, the indicator for disabling a trigger of a periodical registration timer reset by at least one of UL traffic transmission; and a UE transition to a CM-CONNECTED state, running the periodical registration timer while in the CM-CONNECTED state; and performing periodic registration updates when the timer expires.

According to an eighteenth aspect, there is disclosed a method comprising receiving a communication duration value from an AMF; starting a communication activity timer with the communication duration value when transitioning to the CM-CONNECTED state; and stopping the timer when transitioning to the CM-IDLE state.

In an embodiment, the method can further comprise sending an "end of communication" notification to the AMF when communication activity is completed and the timer has not expired.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for managing a connection of a user equipment (UE) to a network, the method comprising actions at an access and mobility management function (AMF) of the network of:
   receiving a registration request from the UE comprising a mobile initiated connection only (MICO) mode preference; and
   transmitting a response to the UE, the response including a determination indicating that the MICO mode is allowed for the UE, a value of a periodic registration update timer, and an indication for disabling the UE's reset of the periodic registration update timer before the periodic registration update timer expires.

2. The method of claim 1, further comprising: when a communication activity schedule suggests the absence of at least one of a downlink and network-initiated communication with the UE, determining that the MICO mode is allowed.

3. The method of claim 2, further comprising: obtaining the communication activity schedule from a unified data management (UDM) function.

4. The method of claim 1, further comprising: when a communication activity suggests a scheduled at least one of the downlink and network-initiated communication with the UE at a specified future time, determining that the MICO mode is allowed and the value of the periodic registration update timer value is such that the periodic registration update timer will expire before the specified future time occurs.

5. An access and mobility management function (AMF) node of a network comprising:
   a processor; and
   a machine-readable memory for storing instructions that, when executed by the processor, cause the AMF node to perform actions of managing a connection of a user equipment (UE) to the network including:
   receiving a registration request from the UE comprising a mobile initiated connection only (MICO) mode preference; and
   transmitting a response to the UE, the response including a determination indicating that the MICO mode is allowed for the UE, a value of a periodic registration update timer, and an indication for disabling the UE's reset of the periodic registration update timer before the periodic registration update timer expires.

6. The AMF node of claim 5, further comprising instructions to cause the AMF node to perform actions including: when a communication activity schedule suggests the absence of at least one of a downlink and network-initiated communication with the UE, determining that the MICO mode is allowed.

7. The AMF node of claim 6, further comprising instructions to cause the AMF node to perform actions including: obtaining the communication activity schedule from a unified data management (UDM) function.

8. The AMF node of claim 5, further comprising instructions to cause the AMF node to perform actions including: when a communication activity suggests a scheduled at least one of the downlink and network-initiated communication with the UE at a future time, determining that the MICO mode is allowed and the value of the periodic registration update timer value is such that the periodic registration update timer will expire before the future time occurs.

9. A method for managing a connection of a user equipment (UE) to a network, the method comprising actions at the UE including:
   transmitting a registration request comprising a mobile initiated connection only (MICO) mode preference to an access and mobility management function (AMF) in the network;
   receiving a response from the AMF, the response including a determination indicating that the MICO mode is allowed, a value of a periodic registration update timer, and an indication for disabling the UE's reset of the periodic registration update timer before the periodic registration update timer expires;
   starting the periodic registration update timer after receiving the response, where a duration of the periodic registration update timer is equal to the received value; and
   keeping the periodic registration update timer running irrespective of a transition from an idle state to a state of connection to the network until expiry of the periodic registration update timer according to the indication.

10. The method of claim 9 wherein, upon expiry of the periodic registration update timer, performing a periodic registration update.

11. The method of claim 9, further comprising: entering the MICO mode after receiving the response.

12. A user equipment (UE) comprising:
a processor; and
a machine-readable memory for storing instructions that, when executed by the processor, cause the UE to perform actions for managing a connection of the UE to a network including:
transmitting a registration request comprising a mobile initiated connection only (MICO) mode preference to an access and mobility management function (AMF) in the network;
receiving a response from the AMF, the response including a determination indicating that the MICO mode is allowed, a value of a periodic registration update timer, and an indication for disabling the UE's reset of the periodic registration update timer before the periodic registration update timer expires;
starting the periodic registration update timer after receiving the response, where a duration of the periodic registration update timer is equal to the received value; and
keeping the periodic registration update timer running irrespective of a transition from an idle state to a state of connection to the network until expiry of the periodic registration update timer according to the indication.

13. The UE of claim 12, further comprising instructions to cause the UE to perform actions including: upon expiry of the periodic registration update timer, performing a periodic registration update.

14. The UE of claim 12, further comprising instructions to cause the UE to perform actions including: entering the MICO mode after receiving the response.

* * * * *

UNITED STATES PATENT AND TRADEMARK OFFICE
CERTIFICATE OF CORRECTION

PATENT NO. : 10,375,665 B2
APPLICATION NO. : 15/881605
DATED : August 6, 2019
INVENTOR(S) : Li et al.

Page 1 of 1

It is certified that error appears in the above-identified patent and that said Letters Patent is hereby corrected as shown below:

In the Specification

Column 9, Lines 25 and 27:
"SUPT" should read --SUPI--

Column 24, Lines 49, 59, 60, 65 and 67:
"NICO" should read --MICO--

Column 25, Lines 1 and 3:
"NICO" should read --MICO--

Signed and Sealed this
Twenty-fourth Day of November, 2020

Andrei Iancu
*Director of the United States Patent and Trademark Office*